US012521579B2

(12) United States Patent
Mun et al.

(10) Patent No.: US 12,521,579 B2
(45) Date of Patent: Jan. 13, 2026

(54) MASK APPARATUS WITH REAR SURFACE INLET, OUTLET AND FILTER ASSEMBLY

(71) Applicant: LG Electronics Inc., Seoul (KR)

(72) Inventors: Yeongcheol Mun, Seoul (KR); Sangkyun Baek, Seoul (KR); Dongkwon An, Seoul (KR); Dongeun Kim, Seoul (KR); Sejeong Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 1041 days.

(21) Appl. No.: 17/572,179

(22) Filed: Jan. 10, 2022

(65) Prior Publication Data

US 2023/0013005 A1 Jan. 19, 2023

(30) Foreign Application Priority Data

Jul. 19, 2021 (KR) ........................ 10-2021-0093944

(51) Int. Cl.
*A62B 18/00* (2006.01)
*A41D 13/11* (2006.01)
(Continued)

(52) U.S. Cl.
CPC ........ *A62B 18/006* (2013.01); *A41D 13/1107* (2013.01); *A62B 18/025* (2013.01); *A62B 23/02* (2013.01)

(58) Field of Classification Search
CPC ..... A62B 18/006; A62B 18/025; A62B 23/02; A62B 18/08; A41D 13/1107
See application file for complete search history.

(56) References Cited

U.S. PATENT DOCUMENTS 4,981,134 A * 1/1991 Courtney ............. A62B 18/025 128/206.15
5,016,625 A 5/1991 Hsu et al.
(Continued)

FOREIGN PATENT DOCUMENTS

CN 202928043 5/2013
CN 206880962 1/2018
(Continued)

OTHER PUBLICATIONS

Extended European Search Report in European Appln. No. 21218251.3, dated May 27, 2022, 9 pages.
(Continued)

*Primary Examiner* — Victoria Murphy
*Assistant Examiner* — Kris Hanyu Gong
(74) *Attorney, Agent, or Firm* — Fish & Richardson P.C.

(57) ABSTRACT

A mask apparatus includes a mask body including a rear body and a front body coupled to a front surface of the rear body and providing an inlet and an outlet, a face guard coupled to the rear body and defining a respiration space, and an air cleaning module purifying air introduced into the inlet and supplying the purified air to the respiration space. A portion of the rear body defines an accommodation portion accommodating the air cleaning module. The air cleaning module includes a fan module disposed at a seating portion of the accommodation portion, a filter disposed at a rear side of the fan module and purifying air flowing into the fan module, and a filter housing including a filter frame surrounding a side surface of the filter and a filter cover covering a rear surface of the filter. The inlet is provided at the filter cover.

18 Claims, 26 Drawing Sheets

(51) Int. Cl.
*A62B 18/02* (2006.01)
*A62B 23/02* (2006.01)

(56) References Cited

U.S. PATENT DOCUMENTS

| | | | | |
|---|---|---|---|---|
| 10,751,660 | B2 * | 8/2020 | Legare | B01D 46/523 |
| 2016/0008558 | A1 * | 1/2016 | Huddart | A61M 16/06<br>128/205.25 |
| 2020/0206545 | A1 | 7/2020 | Kim et al. | |
| 2020/0206546 | A1 * | 7/2020 | Kim | A62B 23/025 |
| 2021/0309146 | A1 * | 10/2021 | Xue | B60Q 5/005 |
| 2023/0279606 | A1 * | 9/2023 | Shin | A61L 9/20<br>34/73 |

FOREIGN PATENT DOCUMENTS

| | | |
|---|---|---|
| CN | 111375150 | 7/2020 |
| EP | 3398657 | 4/2021 |
| KR | 19990020100 U | 6/1999 |
| KR | 101997813 | 10/2019 |
| KR | 20210004492 | 1/2021 |
| KR | 102256713 | 5/2021 |

OTHER PUBLICATIONS

Office Action in Korean Appln. No. 10-2021-0093944, dated Jun. 30, 2022, 17 pages (with English translation).
Office Action in Chinese Appln. No. 202111393900.3, dated Apr. 27, 2023, 7 pages.

* cited by examiner

MASK APPARATUS WITH REAR SURFACE INLET, OUTLET AND FILTER ASSEMBLY

CROSS-REFERENCE TO RELATED APPLICATIONS

The present disclosure claims priority to and the benefit of the Korean Patent Application No. 10-2021-0093944, filed on Jul. 19, 2021, which is herein incorporated by reference in its entirety.

TECHNICAL FIELD

The present disclosure relates to a mask apparatus.

BACKGROUND

A mask may be defined as a hygiene product which can cover user's nose and mouth, so that harmful substances including germs or dust contained in the air are filtered out when the user breathes in, and minimizes transmission of viruses or bad breath emitted when the user breathes out to surrounding people.

Recently, in order to minimize infection as a highly contagious virus spreads, it is recommended that individuals to wear a mask in public for safety.

Currently, various types and shapes of masks have been introduced to the market, and in particular, in order to minimize harmful substances contained in the air from being directly introduced into the mask wearer's respiratory organ, many masks are equipped with a filter module.

In addition, masks are equipped with a fan to facilitate flow of air passing through the masks when the user breathes in or out.

A conventional mask includes a filter so that harmful substances contained in ambient air are filtered out and then introduced into the user's respiratory organ.

In addition, the conventional mask includes a pressure sensing unit measuring pressure of a respiration space provided between the mask and the user's face, and a fan module whose rotational speed is varied according to pressure measured by the pressure sensing unit, to help the user to breathe comfortably even while wearing the mask.

However, the conventional mask has a structure including an air inlet provided at a front side of the mask and an air outlet provided on a rear side of the mask. Specifically, the rear side of the mask corresponds to a point close to the user's mouth or nose. The front side of the mask refers to a portion exposed to the outside and the rear side of the mask refers to a portion in close contact with the user's face.

In detail, the air inlet is generally provided on a front surface close to the center of the mask or on the front surface close to both side ends, and, in the conventional mask, the air inlet is provided on the front surface close to both side ends of the mask.

As such, in the structure in which the air inlet is provided on the front side of the mask and the air outlet is provided on the rear side of the mask, flow of air is excessively frequently changed in a process in which ambient air flows into the mask, passes through the fan and the filter, and then discharges into the user's respiratory organ through the air outlet.

As a number of flow conversion times of the introduced air increases, flow resistance increases, and, as a result, a load of the fan increases. In addition, as the load of the fan increases, a problem occurs in that the power consumption of the battery supplying power to the fan increases.

In addition, as the number of flow conversion times of the introduced air increases, flow noise increases.

In addition, since a user, who wears a mask in which the air inlet is disposed on the front side of the mask, often takes off the mask and puts the mask such that the air inlet faces upward or forward, a possibility that dust is introduced through the air inlet is relatively high.

In addition, when the air inlet is disposed on the front side of the mask, the appearance may provide a bad impression when the mask is worn.

In addition, when the user walks or runs while wearing a mask apparatus, there is a high possibility that foreign substances or insects floating in front of the user are directly introduced into the inlet, such that the life of a filter is shortened and a filter replacement cycle is shortened.

In addition, in order to prevent the air inlet from being exposed to the outside, an inlet cover is mounted. In this case, a phenomenon in which the inlet cover is separated from the mask or damaged by external force or impact may occur.

In addition, in the case of a structure in which the inlet is not provided in the mask body but provided in another portion, for example, a structure in which the inlet is provided in a separate air cleaning module that is detachably or foldably coupled to the side of the mask body, flow resistance is significantly increased while the air introduced into the air cleaning module reaches an outlet provided in the center of the mask body.

In some examples, when the inlet is provided on the rear surface of the mask body, a gap between the inlet and the user's face is very narrow, and, thus, a design of the inlet that may minimize flow resistance of the introduced air is required.

SUMMARY

According to one aspect of the subject matter described in this application, a mask apparatus can include a mask body including a rear body and a front body, the front body being coupled to a front surface of the rear body and providing an inlet and an outlet, a face guard that is coupled to a rear surface of the rear body, that is configured to accommodate a portion of user's face, and that defines a respiration space at an inner side thereof, and an air cleaning module that is mounted on the rear body, that is configured to purify air introduced into the inlet of the front body, and that is configured to supply the purified air to the respiration space. A portion of the rear body can protrude toward the front body and can define an accommodation portion configured to accommodate the air cleaning module, the inlet and the outlet can be respectively provided in the rear surface of the mask body to thereby (i) introducing air into the mask body through the rear surface of the mask body and (ii) supplying the introduced air to the respiration space through the rear surface of the mask body. The air cleaning module can includes a fan module disposed at a seating portion of the accommodation portion, a filter that is disposed at a rear side of the fan module and that is configured to purify air flowing into the fan module, and a filter housing including a filter frame that surrounds a side surface of the filter and a filter cover that covers a rear surface of the filter. The inlet can be provided at the filter cover.

Implementations according to this aspect can include one or more of the following features. For example, the inlet can have a shape of an intaking grille that includes a plurality of intaking slits and a plurality of partitioning ribs.

In some examples, the plurality of intaking slits and the plurality of partitioning ribs (i) can extend from an upper end of the filter cover toward a lower end of the filter cover and (ii) can be alternately arranged from a first side end portion of the filter cover to a second side end portion of the filter cover, and a distance between the first side end portion and a center of the mask body can be shorter than a distance between the first side end portion and an edge of the mask body. In some examples, each of the plurality of partitioning ribs can include an entrance surface defining a portion of the rear surface of the mask body, an exit surface corresponding to an opposite surface of the entrance surface, a first side surface facing the first side end portion of the filter cover, and a second side surface corresponding to an opposite side of the first side surface. The first side surface and the second side surface can be inclined at a predetermined angle with respect to a reference line perpendicular to the entrance surface or the exit surface.

In some implementations, a first inclination angle between the first side surface and the reference line can be greater than a second inclination angle between the second side surface and the reference line. In some examples, the first inclination angle can include a first set of inclination angles and the second inclination angle can include a second set of inclination angles, the first set of inclination angles can correspond to the plurality of partitioning ribs and increase toward the first side end portion of the filter cover, and the second set of inclination angles can correspond to the plurality of partitioning ribs and increase toward the first side end portion of the filter cover.

In some examples, a value of the first inclination angle of a first rib of the plurality of partitioning ribs can be equal to a value of the second inclination angle of a second rib of the plurality of partitioning ribs facing the first inclination angle. In some implementations, the mask apparatus can further include a reinforcing rib partitioning the inlet into an upper intake grille and a lower intake grille.

In some implementations, the accommodation portion can include a fastening surface extending forward from a side end portion of the rear body, a seating surface that extends toward a center of the rear body from an end portion of the fastening surface and that accommodates the air cleaning module, an air guide surface connecting an end portion of the seating surface to a front surface of the rear body, an upper surface connecting upper ends of the fastening surface, the seating surface, and the air guide surface to the front surface of the rear body, and a lower surface connecting lower ends of the fastening surface, the seating surface, and the air guide surface to the front surface of the rear body. In some examples, at least one of the fastening surface or the air guide surface can be curved.

In some implementations, the inlet can be a hole array in which a plurality of holes are defined. In some examples, the plurality of holes can be defined in a width direction and a length direction of the mask body. In some examples, the plurality of holes can have a same diameter.

In some implementations, the plurality of holes can have different diameters. In some examples, diameters of the plurality of holes can decrease from a side end portion of the mask body toward a center of the mask body. In some examples, diameters of the plurality of holes can decrease from a center of the mask body toward an edge of the hole array.

In some implementations, diameters of the plurality of holes can increase from a top of the hole array to a bottom of the hole array. In some implementations, diameters of the plurality of holes can decrease from a top of the hole array to a bottom of the hole array.

The mask apparatus can have the following effects.

First, since both the inlet and outlet of the mask apparatus are provided on the rear surface of the mask body covering the user's face, flow resistance can be significantly reduced, compared to the conventional masks where an inlet of the mask apparatus is provided on the front surface of the mask body or other portions other than the mask body.

Second, since the inlet is not exposed to the outside while the user wears the mask apparatus, a separate cover member to cover the inlet is not required. Furthermore, since a separate cover member does not need to be mounted on the front surface of the mask apparatus, the cover member may not be damaged or separated by external force.

Third, since the inlet is provided on the rear surface of the mask body, when the mask apparatus is taken off so that the front of the mask body faces forward or upward, a phenomenon that dust or other foreign substances are introduced into the mask apparatus through the inlet can be reduced.

Fourth, since the inlet is provided on the rear surface of the mask body, the front of the mask apparatus is neatly treated, providing an additional effect of increasing a purchase desire of buyers.

Fifth, since the inlet is provided in the form of an intake grille including a plurality of intake slits and partition ribs, and a side surface of the partition rib is provided to be inclined, flow resistance of the sucked air can be reduced.

Sixth, since inclination of the side surface of the partition rib increases in a direction from an outer edge to an inner edge of the inlet, the suctioned air passes evenly over the entire surface of the filter, so that the life expectancy of the filter is increased.

DETAILED DESCRIPTION

Figure 1:
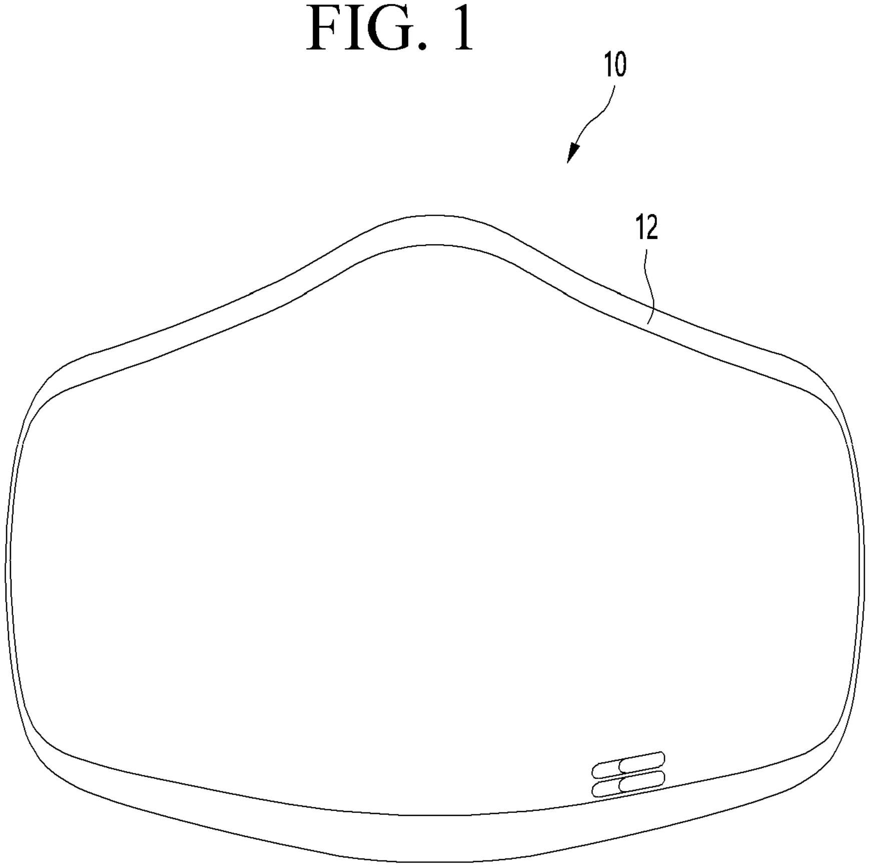
FIG. 1 is a diagram illustrating a front view of an exemplary mask apparatus.
Figure 2:
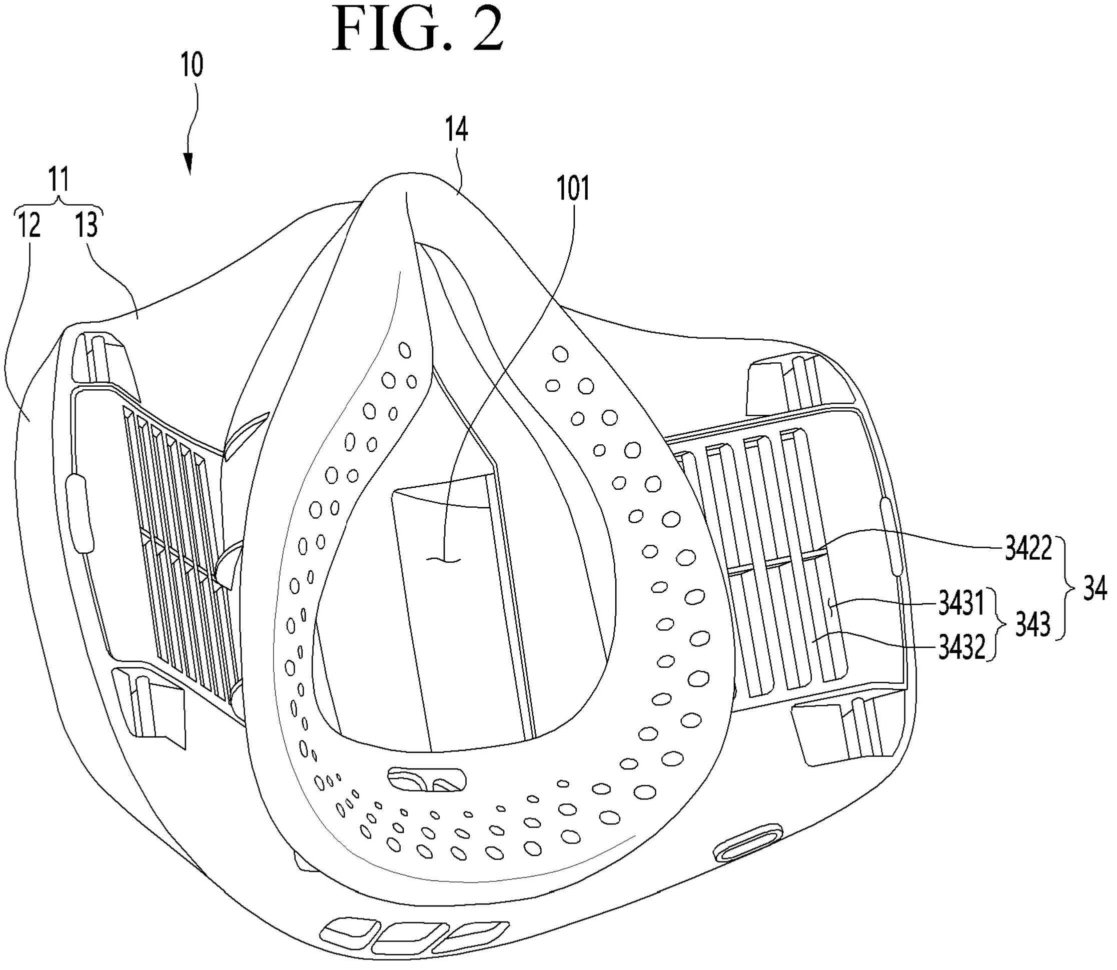
FIG. 2 is a diagram illustrating a rear perspective view of the exemplary mask apparatus.
Figure 3:
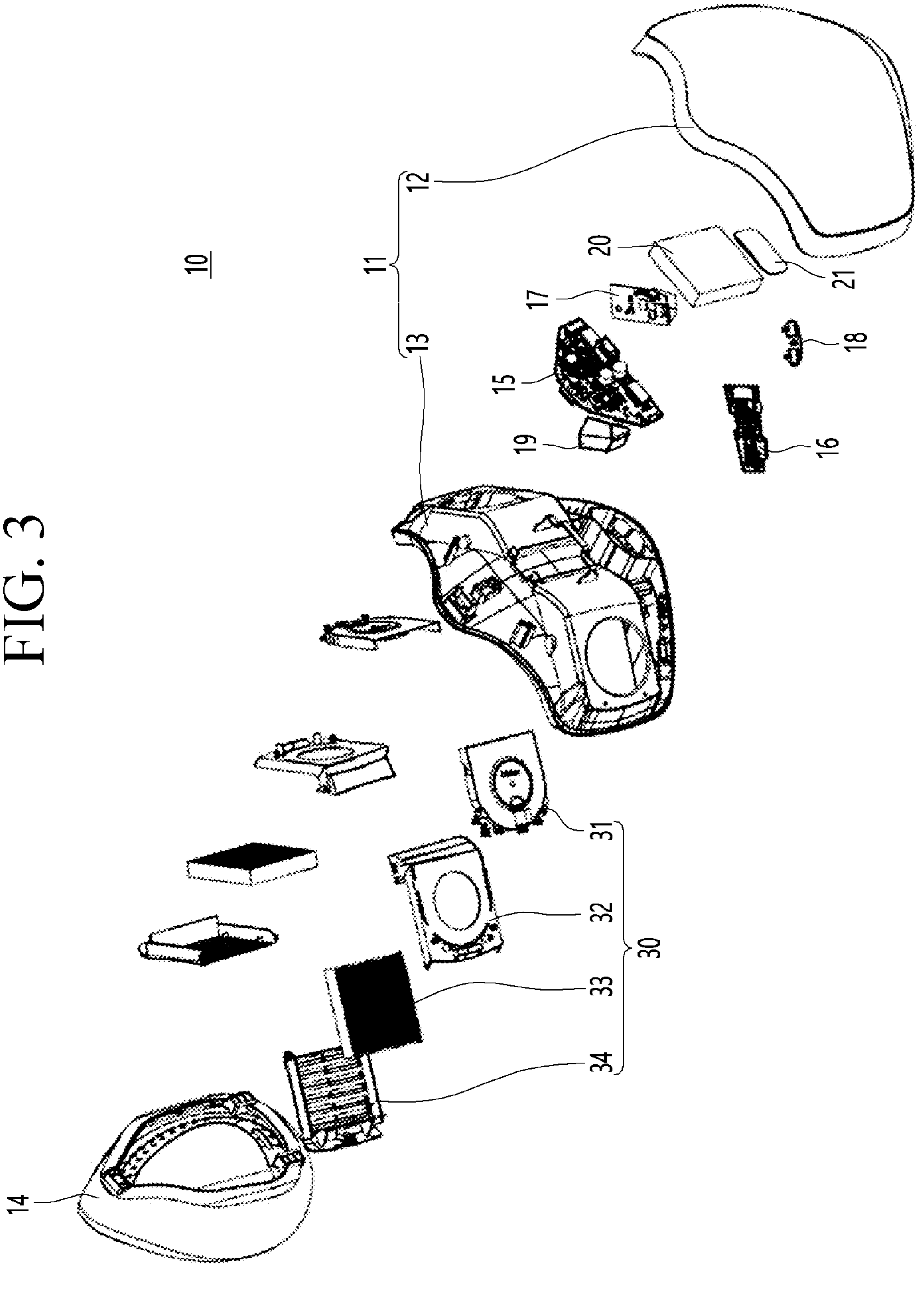
FIG. 3 is a diagram illustrating an exploded perspective view of the exemplary mask apparatus.
Figure 4:
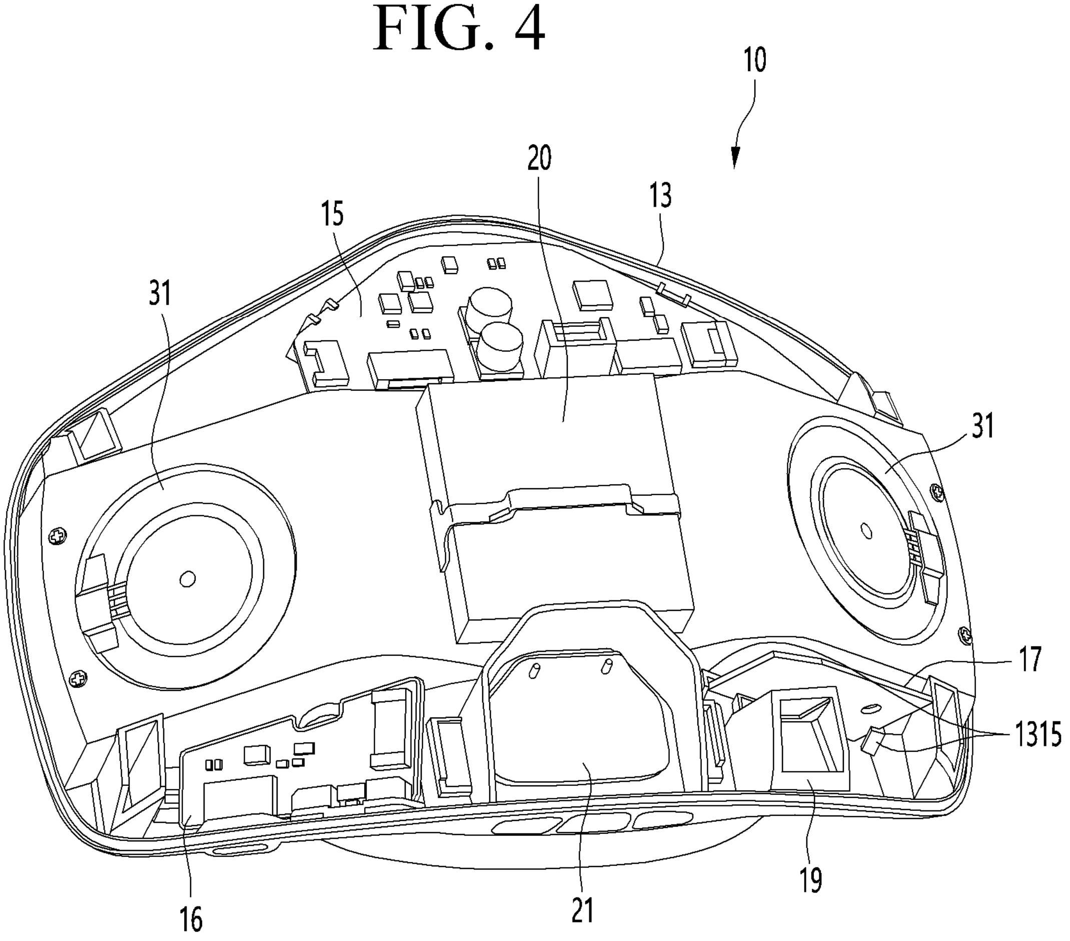
FIG. 4 is a diagram illustrating a front perspective view of the exemplary mask apparatus in which a front body is separated.

FIG. 1 is a diagram illustrating a front view of an exemplary mask apparatus, FIG. 2 is a diagram illustrating a rear perspective view of the exemplary mask apparatus, FIG. 3 is a diagram illustrating an exploded perspective view of the exemplary mask apparatus, and FIG. 4 is a diagram illustrating a front perspective view of the exemplary mask apparatus in which a front body is separated.

Referring to FIGS. 1 to 4, a mask apparatus 10 can include a mask body 11, a face guard 14 fixed to or detachably coupled to a rear surface of the mask body 11, and an air cleaning module 30 mounted inside the mask body 11.

For example, the mask body 11 includes a front body 12 defining a front exterior and a rear body 13 coupled to a rear surface of the front body 12 to define a rear exterior. The front surface of the front body 12 defines a front surface of the mask apparatus 10, and the rear surface of the rear body 13 faces a face of a user (or a wearer).

In some implementations, the face guard 14 is coupled to the rear surface of the rear body 13 to be in close contact with the user's face and may be made of a silicone or rubber material having elasticity. A respiration space is defined inside the face guard 14, and when the user wears the mask apparatus 10, the user's nose and mouth are accommodated in the respiration space. Accordingly, the ambient air purified while passing through the air cleaning module 30 is guided to the respiration space, inhaled by the user, and air generated when the user exhales is also discharged into the respiration space.

A predetermined space is defined between the front body 12 and the rear body 13, and as depicted in FIG. 4, various electrical components are mounted on the front surface of the rear body 13. Further, the various electrical components are shielded by the front body 12 so as not to be exposed to the outside.

In some implementations, the air cleaning module 30 includes a fan module 31 disposed in the accommodation portion 133 (refer to FIG. 6) defined at the rear body 13 and a filter 33 placed on the rear side of the fan module 31. The fan module 31 can include a centrifugal fan that suctions air in an axial direction and discharges air in a radial direction.

The air cleaning module 30 can further include a filter housing 34 disposed at the rear side of the filter 33, and the filter housing 34 has an inlet through which ambient air is introduced. The filter housing 34 can be rotatably coupled to the rear body 13, and the inlet can be provided in the form of an intake grille 343 as shown.

The intake grille 343 can be a structure including a plurality of intake slits 3431 and a plurality of partition ribs 3432 disposed between the adjacent intake slits of the intake grille 343. The intake grille 343 can be a structure in which one large inlet is divided into a plurality of narrow and long intake slits 3431 by the plurality of partition ribs 3432. In some implementations, the plurality of narrow and long intake slits 3431 can be divided into an upper slit and a lower slit by a reinforcing rib 3422. Hereinafter, the inlet formed in the rear surface of the mask apparatus 10 for intaking ambient air is defined as including various types of holes including the intake grille 343, and the inlet of the mask body 11 and the intake grille 343 should be interpreted as the same meaning.

An outlet 101 is defined at a point spaced apart from the inlet in the center direction of the rear body 13. Ambient air introduced through the inlet or the intake grille 343 by the operation of the fan module 31 sequentially passes through the filter 33 and the fan module 31, and then is discharged into the respiration space through the outlet 101.

The inlet, that is, the intake grille 343, can be disposed at the outside of the face guard 14, the outlet 101 is disposed at the inside of the face guard 14. For example, the intake grille 343 is located outside the respiration space and the outlet 101 is located inside the respiration space, so that ambient air being introduced and air exhaled by the user are not mixed with each other.

In some implementations, the air cleaning module 30 can further include a flow guide 32 disposed at the rear side of the fan module 31.

In some implementations, the mask apparatus 10 can further include at least one of the main control module 15, a power module 16, an indicator module 18, a wireless communication module 17, a speaker module 19, a battery 20, or an exhaust valve 21.

For example, the main control module 15 is a module for controlling operations of the fan module 31, the speaker module 19, a pressure sensor, and a microphone. The main control module 15 can be disposed above the front center of the rear body 13.

The power module 16 can be a control module for supplying power to the electric components mounted on the mask apparatus 10. The power module 16 can be disposed at a lower right side of the front side of the rear body 13.

In the power module 16, a cable connector into which a terminal of a cable for power supply and data transmission can be inserted, and an LED module configured to inform an operation state of the mask apparatus 10 can be mounted. Also, light irradiated from the LED module can be diffused and guided through the indicator module 18 to be emitted to the outside of the mask apparatus 10.

The wireless communication module 17 can be any one of various types of short-range wireless communication modules including BLUETOOTH. The wireless communication module 17 can be disposed on a lower end of the left on the front surface of the rear body 13. The wireless communication module 17 may be disposed in a direction perpendicular to the rear body 13, for example, horizontally on a front surface of the rear body 13. The wireless communication module 17 can be mounted on the front surface of the rear body 13 in a horizontal state by a pair of substrate insertion ribs 1315 protruding from the front surface of the rear body 13. Both side ends of the wireless communication module 17 are supported by a pair of substrate insertion ribs 1315.

The speaker module 19 can be disposed at the lower end of the left on the front surface of the rear body 13 corresponding to a lower side of the wireless communication module.

The battery 20 can be disposed at the center of the front of the rear body 13, and the exhaust valve 21 can be disposed to shield an exhaust port provided below the center of the front of the rear body 13. For example, when the user exhales, the exhaust valve 21 can open the exhaust port, and when the user inhales, the exhaust valve 21 can block the exhaust port. The exhaust valve 21 can be bent and provided in the form of a flat flap.

Here, the front, back, left, and right sides of the mask body 11 are defined based on a state in which the user wears the mask apparatus 10.

Figure 5:
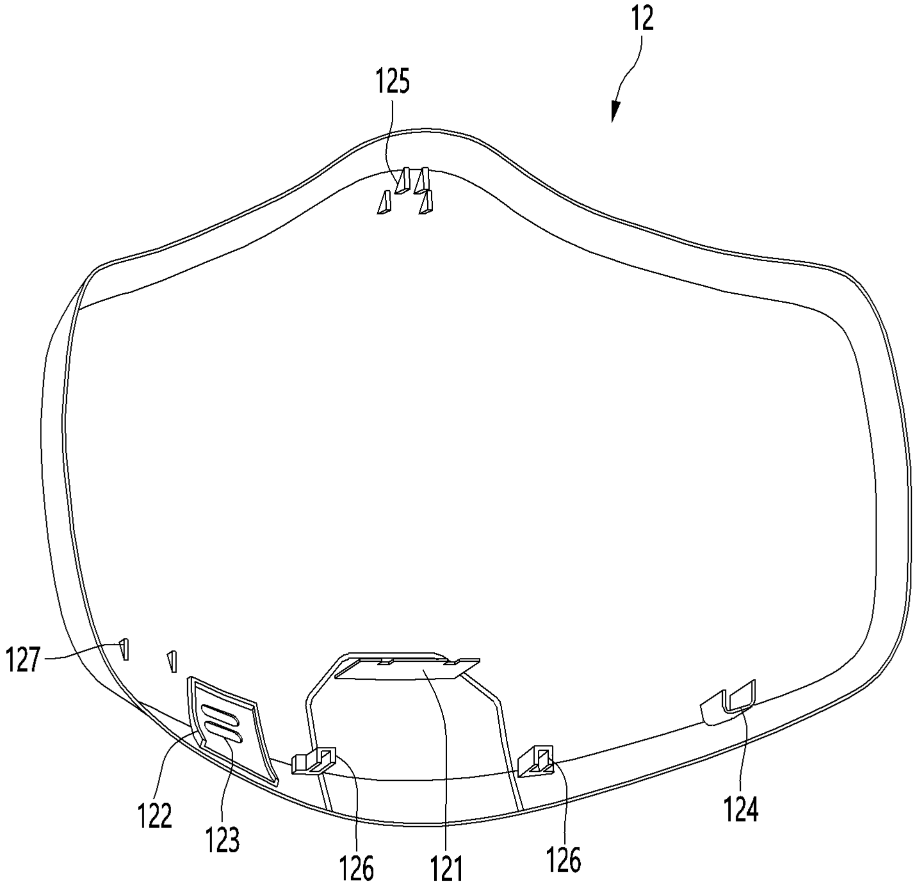
FIG. 5 is a diagram illustrating a rear perspective view of a front body of an exemplary mask apparatus.

FIG. 5 is a diagram illustrating a rear perspective view of the front body of the exemplary mask apparatus.

Referring to FIG. 5, the front body 12 of the mask apparatus 10 defines the front exterior of the mask apparatus 10.

The front surface of the front body 12 may not have a separate component and may be formed as a single body so as to be seen neat in terms of appearance. In a case where inlets are provided on the left and right sides of the front body 12, if the mask apparatus 10 is taken off and placed such that the inlet faces upward, there is a possibility that foreign substances may be introduced into the mask apparatus 10 through the inlet.

In addition, when a separate cover is installed to shield the inlet to minimize introduction of foreign substances, a gap needs to be formed between the edge of the cover and the front surface of the front body 12 to allow ambient air to be introduced. Thus, there is a limitation that the separate cover should be coupled to the front surface of the front body 12 in a form that protrudes from the front surface of the front body 12.

As a result, there is a high possibility that the separate cover is damaged by an external force or is caught by a surrounding obstacle to be separated from the front body 12. For this reason, it would be advantageous for appearance and securing durability to design the front body 12 so that an inlet for intaking ambient air is not formed as possible to prevent a separate component from being additionally mounted on the front surface of the front body 12 to protrude.

In consideration of this aspect, an inlet for intaking ambient air may not be formed on the front surface of the front body 12, and additional components including a cover may not mounted at all, thereby designing such that the front surface forms a single, smooth, continuous surface. In some implementations, a speaker hole 123 can be provided on one lower side so that the user's voice is output to the outside.

In some implementations, a plurality of protrusion structures can be provided on the rear surface of the front body 12.

For example, one or a plurality of substrate fixing ribs 125 can protrude from the top of the center of the rear surface of the front body 12. When the edge of the front body 12 is coupled to the edge of the front surface of the rear body 13, the one or more substrate fixing ribs 125 press the front surface of the main control module 15 mounted on the rear body 13 to block movement of the main control module 15.

A valve support rib 121 can protrude horizontally from the rear surface of the front body 12. The valve support rib 121 can be provided at a point where an upper end of the exhaust valve 21 is located, to press the upper end of the front surface of the exhaust valve 21 when the front body 12 is coupled to the rear body 13. For example, the valve support rib 121 can have a predetermined width and extend rearward by a predetermined length from a point spaced apart by a predetermined distance downward from the center of the rear surface of the front body 12.

In some implementations, a pair of magnet pressing ribs 126 can protrude from the rear surface of the front body 12. For example, the face guard 14 can be mounted on the rear surface of the rear body 13, a magnet is mounted on the front surface of the face guard 14, and a magnet applying attractive force with the magnet is also mounted on the front surface of the rear body 13. As a result, the face guard 14 can be detachably mounted on the rear surface of the rear body 13 by a magnetic force of the magnet.

In some implementations, a pair of lower magnet mounting portions 135 (depicted in FIG. 6) for mounting the magnet is provided on the front surface of the rear body 13. In some implementations, the pair of magnet pressing ribs 126 can respectively press the pair of magnets mounted on the pair of lower magnet mounting portions 135.

In some implementations, a substrate pressing rib 127 in contact with a front end portion of the substrate of the wireless communication module 17 can protrude from the rear surface of the front body 12. For example, when the front body 12 and the rear body 13 are coupled to each other, the substrate pressing rib 127 presses the front end portion of the substrate of the wireless communication module 17 to block the wireless communication module 17 from moving or being detached from the substrate insertion rib 1315.

In some implementations, a support rib 122 that surrounds and supports the edge of the front end portion of the speaker module 19 can be provided on the rear surface of the front body 12 corresponding to the edge of the speaker hole 123. The support rib 122 can be surrounded in a shape corresponding to a shape of the front surface portion of the speaker module 19.

In some implementations, a substrate fixing rib 124 pressing the front surface of the power module 16 can protrude from the rear surface of the front body 12. The substrate fixing rib 124 can press the front surface of the substrate constituting the power module 16 to block the power module 16 from moving or being detached from the rear body 13.

Figure 6:
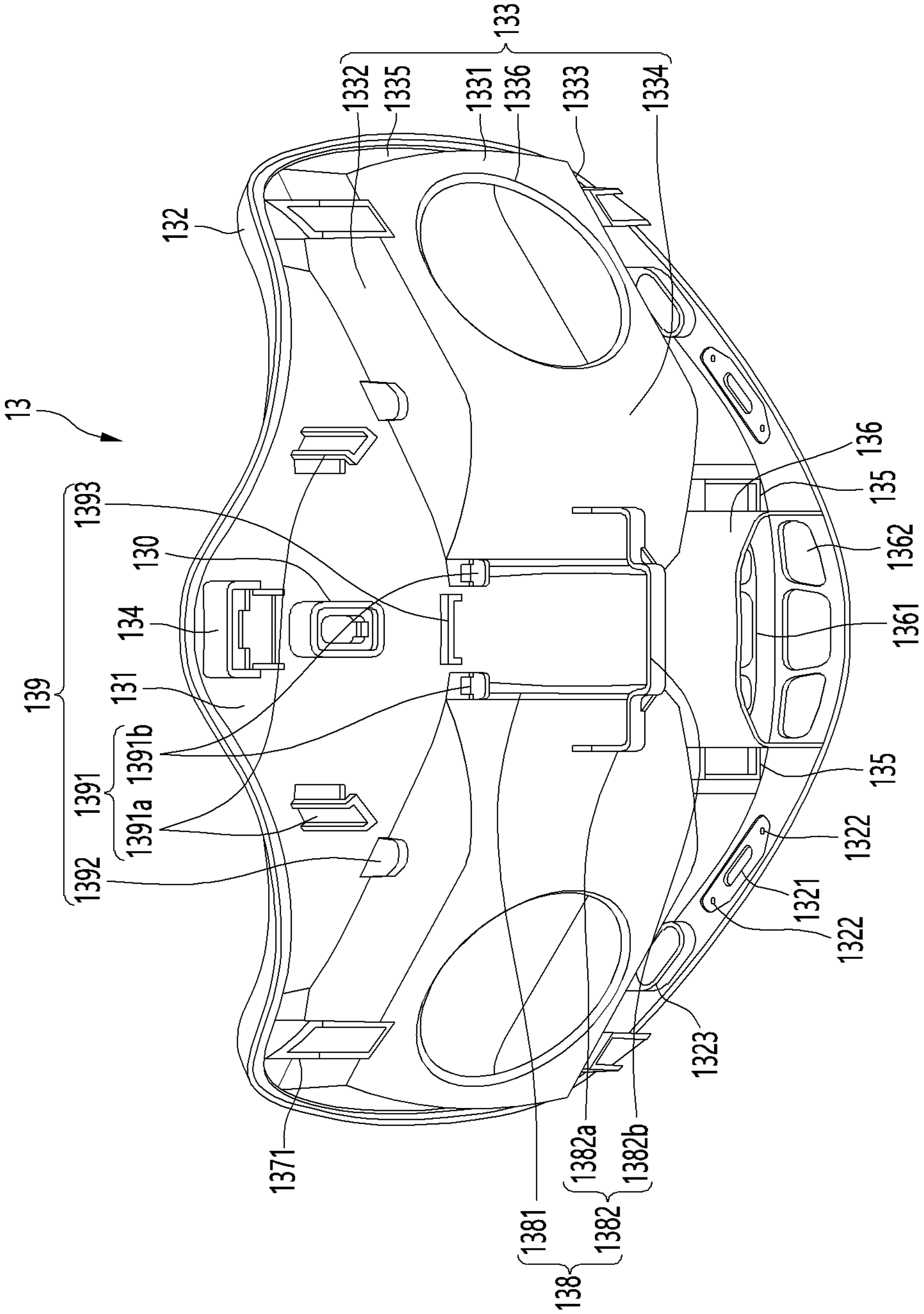
FIG. 6 is a diagram illustrating a front perspective view of a rear body of an exemplary mask apparatus.
Figure 7:
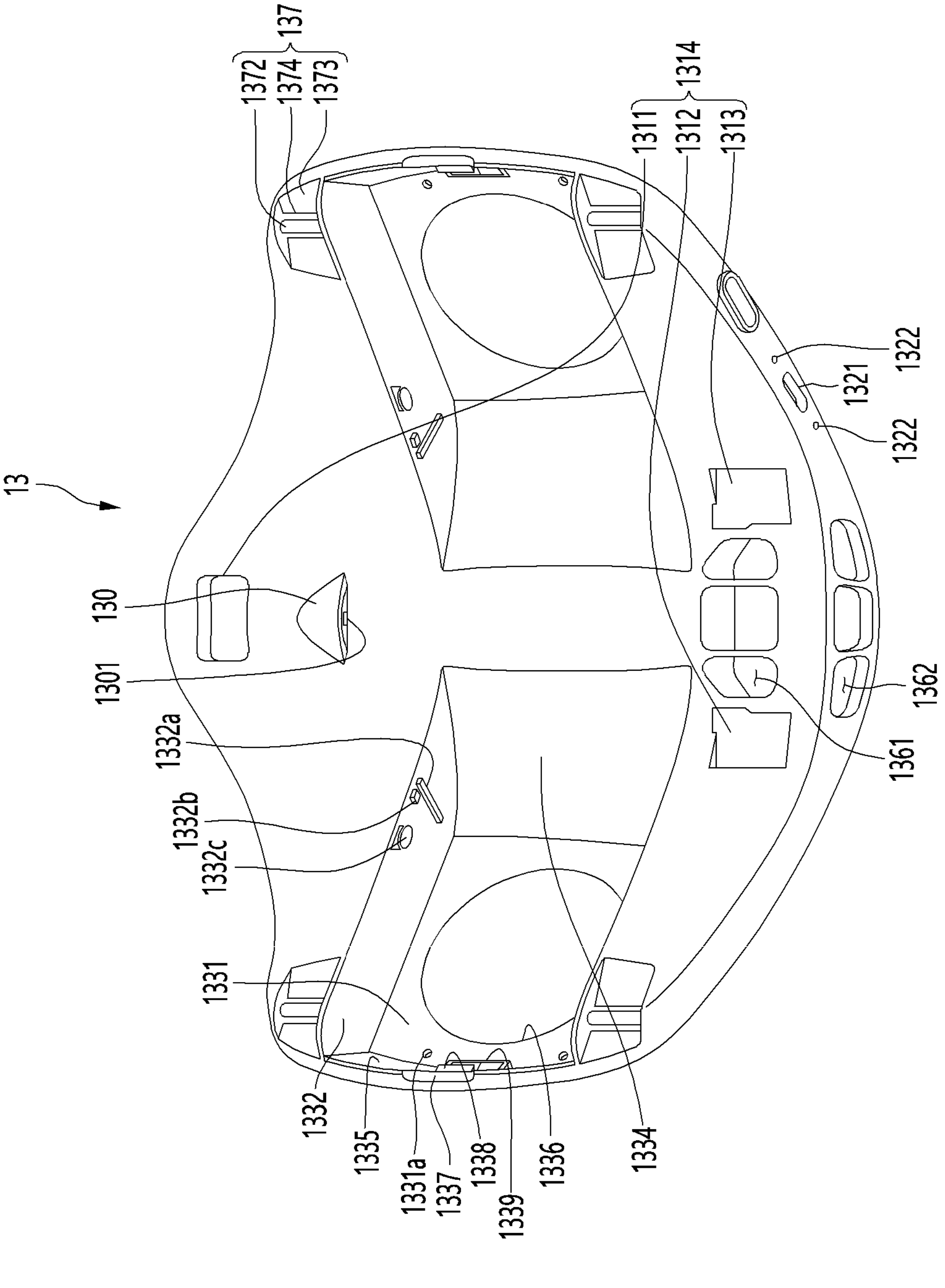
FIG. 7 is a diagram illustrating a rear perspective view of the rear body.

FIG. 6 is a diagram illustrating a front perspective view of a rear body of an exemplary mask apparatus, and FIG. 7 is a diagram illustrating a rear perspective view of the rear body.

Referring to FIGS. 6 and 7, the rear body 13 of the mask apparatus 10 can include a face cover portion 131 covering the user's face and a fused portion 132 that is bent forward from the edge of the face cover portion 131.

For example, the fused portion 132 is continuously provided along an edge of an upper surface, edges of both side surfaces, and an edge of a lower surface of the face cover portion 131. In addition, a front-to-rear directional width of the fused portion 132, which is bent along the edge of the lower surface of the face cover portion 131 and extends forward, is the largest among other directional widths.

In the fused portion 132, a portion defined on the edge of the lower surface of the face cover portion 131 can be specifically defined as an extension jaw. The extension jaw can have a convexly rounded shape in such a way that the front-to-rear directional width increases from both side ends of the rear body 13 toward the center.

A lower surface exhaust port 1362 can be provided in the center of the fused portion 132, which is defined as an extension jaw, and a button hole 1321 can be defined at a point spaced apart from the lower surface exhaust port 1362 toward a side end portion of the rear body 13. A power button can be inserted into the button hole 1321. Indication holes 1322 can be respectively defined at points spaced apart from the left and right edges of the button hole 1321.

Light irradiated from a light emitting unit mounted on the power module 16 can be emitted to the outside through the pair of indication holes 1322. The light emitting unit can include an LED module.

When light is emitted to the outside through any one of the pair of indication holes 1322, it can indicate that power of the mask apparatus 10 is turned on. In some implementations, a remaining capacity of the battery 20 can be predicted according to a color of light emitted through the other of the pair of indication holes 1322.

A terminal insertion hole 1323 can be defined at a point further spaced apart from the button hole 1321 toward a side end portion of the rear body 13. A universal serial bus (USB) cable can be inserted into a terminal connector provided in the power module 16 through the terminal insertion hole 1323. The battery 20 can be charged through the USB cable, and a version or function of the mask apparatus 10 can be updated or upgraded by data transmitted through the USB cable.

The rear body 13 has an accommodation portion 133 for accommodating the air cleaning module 30. The accommodation portion 133 is provided on each of the left and right sides from the center of the rear body 13, and the pair of accommodation portions 133 are symmetrical with respect to a vertical line passing through the center of the rear body 13.

The accommodation portion 133 protruding forward from the front surface of the face cover portion 131 can define a space for accommodating the air cleaning module 30. The accommodation portion 133 can include a seating surface 1331 on which the air cleaning module 30, specifically, the fan module 31, is mounted, a fastening surface 1335 connecting the outer edge of the seating surface 1331 at a side end portion of the face cover portion 131, and an air guide surface 1334 connecting the front surface of the face cover portion 131 at an inner edge of the seating surface 1331.

In some implementations, the accommodation portion 133 can further include an upper surface 1332 connecting upper ends of the seating surface 1331, the air guide surface 1334, and the fastening surface 1335 to the front surface of the face cover portion 131. In some implementations, the accommodation portion 133 can further include a lower surface 1333 connecting lower ends of the seating surface 1331, the air guide surface 1334, and the fastening surface 1335 to the front surface of the face cover portion 131.

The fastening surface 1335 can include one or more fastening units, for example, fastening hooks.

A fan mounting hole 1336 can be defined at the seating surface 1331, and the upper surface 1332 and the lower surface 1333 can extend horizontally and extend in parallel to each other.

The fastening surface 1335 can be convexly rounded toward the outside of the rear body 13 and can be inclined toward the center of the rear body 13 in a direction from the face cover portion 131 to the seating surface 1331.

The air guide surface 1334 can extend convexly and roundly from the seating surface 1331 toward the face cover portion 131 and can be designed such that air introduced by the fan module 31 is smoothly guided toward the outlet 101 along the air guide surface 1334.

In some implementations, the air guide surface 1334 can include a round portion rounded with a predetermined curvature at an inner edge of the seating surface 1331 and an inclination portion connecting the face cover portion 131 flatly and slantingly at an end portion of the round portion.

The accommodation portion 133 can include a left accommodation portion provided on the left side from the center of the rear body 13 and a right accommodation portion provided on the right side from the center of the rear body 13. The left accommodation portion and the right accommodation portion can be spaced apart from the center of the rear body 13 by a predetermined distance, and the battery 20 can be mounted in a space between the left accommodation portion and the right accommodation portion.

A battery mounting portion 138 can be provided on the front surface of the rear body 13. For example, the battery mounting portion 138 includes a pair of battery seating ribs 1381 and a battery support rib 1382.

The pair of battery seating ribs 1381 can protrude forward from the front surface of the face cover portion 131 or the edge of the air guide surface 1334, and extend in parallel in a vertical direction. The pair of battery seating ribs 1381 can support the rear surface of the battery 20.

One end portion of the battery support rib 1382 can extend from either one of the left air guide surface 1334 and the right air guide surface 1334, and the other end is connected to the other side of the left air guide surface 1334 and the right air guide surface 1334.

The battery support rib 1382 can have an n-shape and can support the front and both side surfaces of the battery 20. Accordingly, a probability for the battery 20 being separated from the rear body 13 can be reduced by the battery support rib 1382.

In some implementations, a central portion of the battery support rib 1382 protrudes forward to enable another battery having different size from the battery which is mounted on the battery mounting portion 138 to be selectively mounted.

For example, the battery support rib 1382 includes a pair of extension portions extending forward from the pair of air guide surfaces 1334 and a connection portion extending in the horizontal direction to connect the pair of extension portions.

In some implementations, a portion of the connection portion is bent and extended forward, so that the battery support rib 1382 can include a first battery support portion

1382*a* and a second battery support portion 1382*b*. For example, the first battery support portion 1382*a* can support a relatively wide and thin battery, and the second battery support portion 1382*b* can support a relatively narrow and thick battery.

The second battery support portion 1382*b* may be described as being formed by bending a portion of the connection portion constituting the first battery support portion 1382*a* forward a plurality of times. In addition or alternatively, it may be described that a relatively small n-shaped second battery support portion 1382*b* protrudes from the front surface of a relatively large n-shaped first battery support portion 1382*a*.

An exhaust flow path guide 136 can protrude forward from the front surface of the face cover portion 131 corresponding to a lower side of the battery mounting portion 138. For example, the exhaust flow path guide 136 can be provided below the battery mounting portion 138, and a lower end of the battery 20 mounted on the battery mounting portion 138 can be supported by an upper surface of the exhaust flow path guide 136. As a result, the battery 20 can be blocked from being pulled downward due to gravity while being inserted into the battery mounting portion 138.

The exhaust flow path guide 136 can form a longitudinal cross-section of a substantially tunnel shape, and a front surface exhaust port 1361 can be provided at the face cover portion 131 corresponding to an inner side of the exhaust flow path guide 136.

At least one of the front surface exhaust port 1361 and the lower surface exhaust port 1362 can be provided in the form of an exhaust grille divided into a plurality of small exhaust ports by a plurality of grills or partition ribs. In some implementations, the front surface exhaust port 1361 can be selectively opened and closed by the exhaust valve 21.

An upper magnet mounting portion 134 can be provided at an upper end of a center of the front surface of the face cover portion 131, and a pair of lower magnet mounting portions 135 can be provided at a lower end of the front surface of the face cover portion 131.

For example, the lower magnet mounting portions 135 can be provided on the left edge and the right edge of the exhaust flow path guide 136, respectively. A magnet mounted on the lower magnet mounting portion 135 can be pressed by the pair of magnet pressing ribs 126 (depicted in FIG. 5) protruding from the rear surface of the front body 12.

A strap connection portion 137 can be provided at each of the left end portion and the right end portion of the rear body 13. For example, the strap connection portion 137 is a portion to which an end portion of a strap or band caught on the user's ear or wrapping around the back of the user's head is connected. The strap connection portion 137 can be provided at each of upper and lower portions of the left end of the rear body 13 and upper and lower portions of the right end of the rear body 13.

Both end portions of any one of the pair of straps can be respectively connected to the strap connection portion 137 provided at the upper left and lower ends, and both end portions of the other can be connected to the strap connection portion 137 provided at the upper and lower ends of the right side. Then, the pair of straps can be hung on both ears of the user, respectively.

In some implementations, both end portions of any one of the pair of straps can be respectively connected to the strap connection portions 137 provided at the upper left and upper right ends, and both end portions of the other can be connected to the strap connection portions 137 provided at the left lower end and the right lower end. Then, the pair of straps can be wrapped around the user's back of the head.

Each of the four strap connection portions 137 can include a strap recess 1373 recessed from the front surface of the rear body 13 and extending in a horizontal direction (a width direction of the rear body), a strap hole 1374 defined at a certain point of the strap recess 1373, a strap bar 1372 connecting upper and lower surfaces of the strap recess 1373, and a tubular waterproof rib 1371 extending from the rear surface of the rear body 13 corresponding to the edge of the strap hole 1374.

In some implementations, a main control module mounting portion 139 can be provided on the front surface of the rear body 13.

For example, the main control module mounting portion 139 includes a substrate fixing hook 1391 protruding forward from the front surface of the face cover portion 131, and a substrate seating rib 1393 and a substrate support rib 1392 supporting a rear surface of the main control module 15.

For example, the substrate fixing hook 1391 can include a pair of first substrate fixing hooks 1391*a* positioned above the accommodation portion 133 and a pair of second substrate fixing hooks 1391*b* positioned between the pair of accommodation portions facing each other.

The pair of first substrate fixing hooks 1391*a* can be disposed at a point spaced upward from an upper surface of the left accommodation portion and at a point spaced apart upward from an upper surface of the right accommodation portion. The pair of first substrate fixing hooks 1391*a* can couple left and right end portions of the main control module 15.

In some implementations, the pair of second substrate fixing hooks 1391*b* can be respectively located at points corresponding to the inner upper ends of the pair of accommodation portions 133. For example, any one of the pair of second substrate fixing hooks 1391*b* can be provided at a point where an upper edge of the right accommodation portion meets the front surface of the face cover portion 131. In some implementations, the other of the pair of second substrate fixing hooks 1391*b* can be provided at a point where an upper edge of the left accommodation portion meets the front surface of the face cover portion 131.

The pair of second substrate fixing hooks 1391*b* can couple a lower end portion of a control board of the main control module 15.

In some implementations, the substrate seating rib 1393 can protrude from the front surface of the face cover portion 131 which is corresponding to a point between the pair of second substrate fixing hooks 1391*b*, to support a rear surface of a lower end portion of the control board of the main control module 15.

In some implementations, the rear surface of the upper end of the main control module 15 can be supported by a front end portion of the upper magnet mounting portion 134. The main control module 15 can be spaced apart from the face cover portion 131 by the upper magnet mounting portion 134 and the substrate seating rib 1393 and can be stably coupled to the rear body 13, without vibrations, by the substrate fixing hook 1391.

In some implementations, a pressure sensor mounting portion (or respiration sensor mounting portion) 130 can be provided at the center of an upper portion of the front surface of the face cover portion 131. A pressure sensor mounted on the pressure sensor mounting portion 130 can measure pressure inside the respiration space defined inside the face guard 14. For example, it may be determined whether the user is currently inhaling or exhaling according to a change in pressure inside the respiration space. The pressure sensor can refer to a respiration sensor, and it should be understood as a sensor performing the same function.

The pressure sensor mounting portion 130 can be provided on the front surface of the rear body 13, and when the main control module 15 is mounted on the main control module mounting portion 139, the pressure sensor mounting portion 130 can be positioned at a point where the pressures sensor (or respiration sensor) mounted on the rear surface of the main control module 15 is positioned. Thus, when the main control module 15 is mounted on the main control module mounting portion 139, the pressure sensor can be accommodated in the pressure sensor mounting portion 130. In some implementations, a front end of the pressure sensor mounting portion 130 is in close contact with the rear surface of the control board of the main control module 15.

In some implementations, a portion defining a bottom of the pressure sensor mounting portion 130 protrudes to the rear of the rear body 13, and a through hole 1301 can be defined at a lower surface of the portion protruding to the rear. Through the through hole 1301, the respiration space defined by the rear surface of the rear body 13 and the face guard 14 and the internal space of the pressure sensor mounting portion 130 can be in fluid communication with each other. As a result, a portion of the air generated when the user exhales can flow into the internal space of the pressure sensor mounting portion 130 through the through hole 1301. Then, the pressure sensor accommodated in the pressure sensor mounting portion 130 can measure the pressure inside the pressure sensor mounting portion 130. Also, the measured pressure value can be transmitted to a microcomputer of the main control module 15, and the user's breathing state (exhaling or inhaling) can be determined.

In some implementations, a magnet mounting recess 1314 can be provided on each of the rear surface of the rear body 13 corresponding to the direct rear surface of the upper magnet mounting portion 134 and a rear surface of the rear body 13 corresponding to a direct rear surface of the pair of lower magnet mounting portions 135.

The magnet mounting recess 1314 can include a first magnet mounting recess 1311 provided on a direct rear surface of the upper magnet mounting portion 134, and a second magnet mounting recess 1312 and a third magnet mounting recess 1313 provided on a direct rear surface of the lower magnet mounting portion 135.

Three magnets mounted on the face guard 14 can be respectively attached to the first to third magnet mounting recesses 1311 to 1313 by magnetic force. Also, when the user pulls the face guard 14 with a force greater than the magnetic force, the face guard 14 can be easily detached from the rear body 13.

In some implementers, a fan mounting hole 1336 can be defined in the seating surface 1331 of the accommodation portion 133. In some implementations, one or a plurality of flow guide fastening holes 1331*a* can be defined at a point spaced apart from the fan mounting hole 1336 toward an outer edge of the seating surface 1331. The flow guide 32 can be coupled to the accommodation portion 133 by a fastening member passing through the flow guide fastening hole 1331*a*.

In some implementations, a flow guide hook 1339 and a filter hook 1338 can be provided to be spaced apart from each other in a front-rear direction on the fastening surface 1335 of the accommodation portion. The flow guide hook 1339 is located closer to the seating surface 1331 than the filter hook 1338 is located.

In some implementations, a grip recess 1337 can be provided at a side end of the rear surface of the rear body 13 corresponding to the rear of the filter hook 1338. For example, the grip recess 1337 can be provided at a point where the fused portion 132 and the fastening surface 1335 meet.

Figure 8:
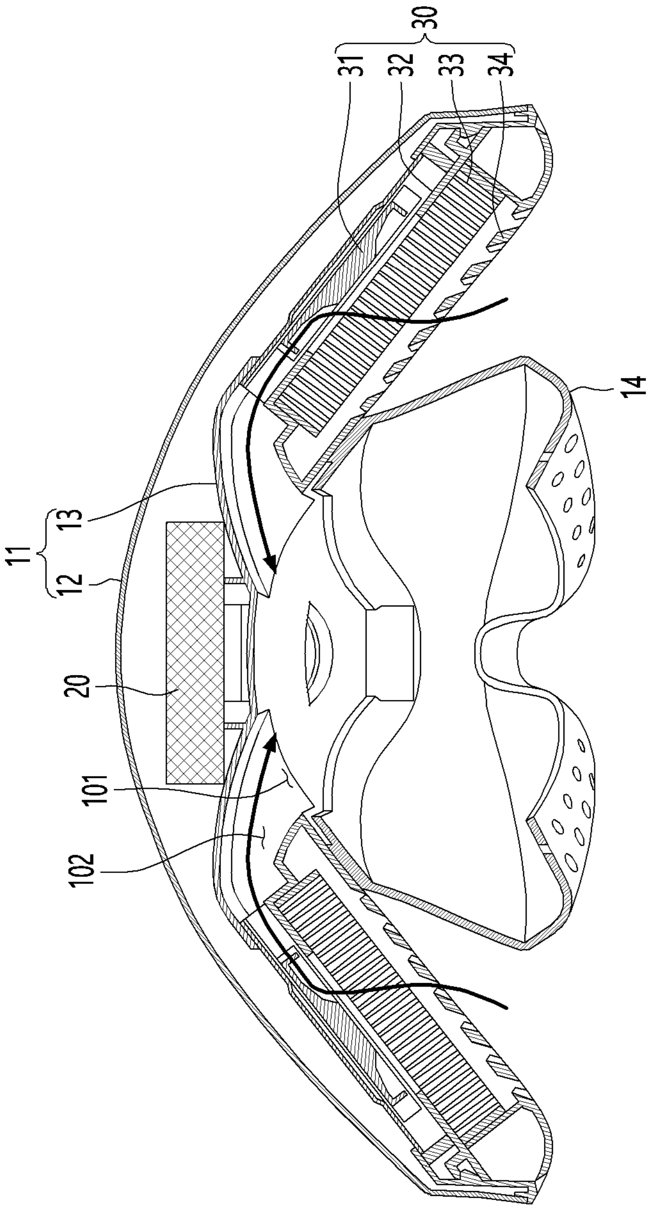
FIG. 8 is a diagram illustrating a cross-sectional view of an exemplary mask apparatus.
Figure 9:
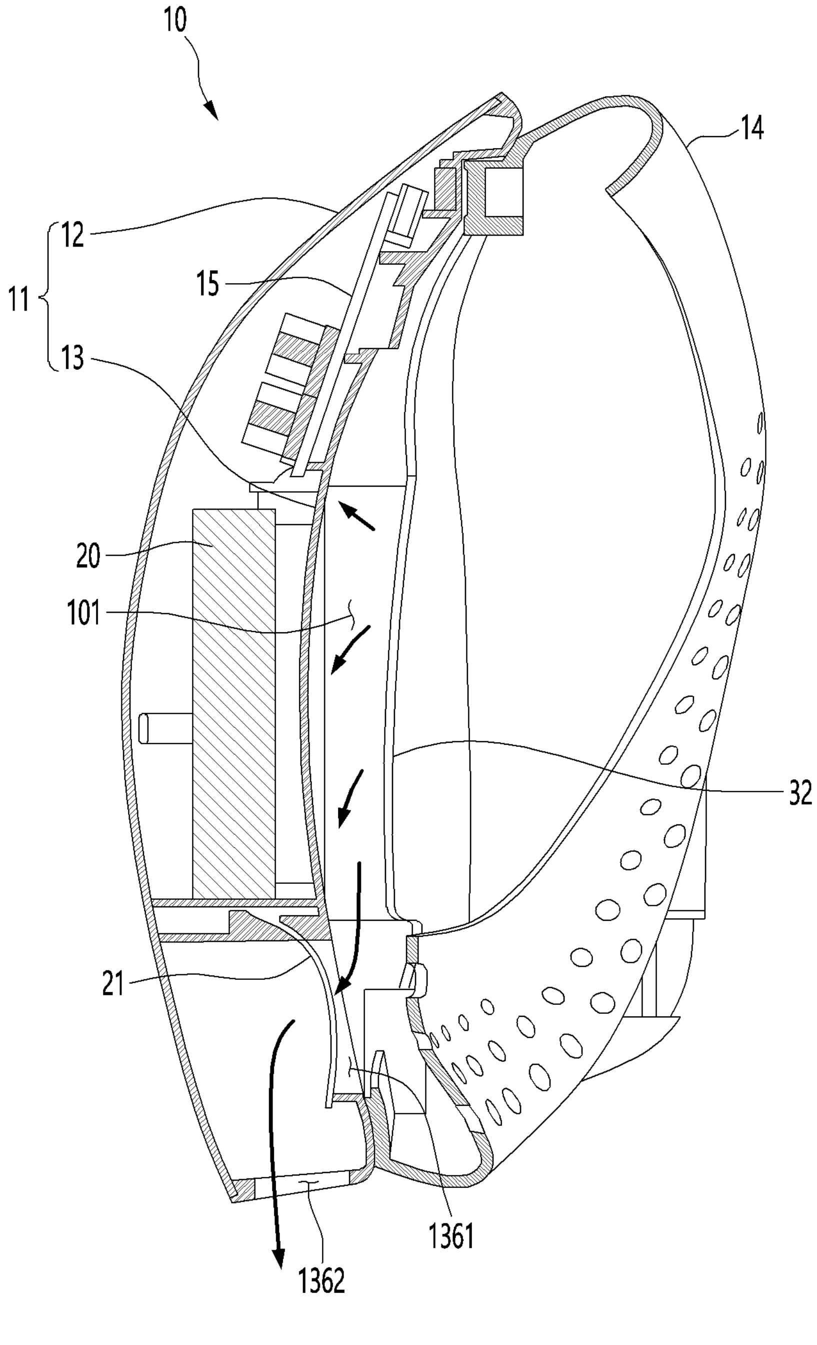
FIG. 9 is a diagram illustrating a longitudinal cross-sectional view of the exemplary mask apparatus.

FIG. 8 is a diagram illustrating a cross-sectional view of an exemplary mask apparatus, and FIG. 9 is a diagram illustrating a longitudinal cross-sectional view of the exemplary mask apparatus.

Referring to FIGS. 8 and 9, when the user operates the fan module 31 by pressing a power button, ambient air is introduced into the mask apparatus 10 through the intake grille 343 (or inlet) provided on the left and right sides of the rear surface of the mask apparatus 10.

Ambient air introduced through the intake grille 343 can be purified while passing through the filter 33. In some implementations, the air passing through the filter 33 can be introduced in an axial direction of the fan module 31 and then discharged in a radial direction.

As depicted in FIG. 8, the front surface of the fan module 31 can be seated on the seating surface 1331, and the rear surface of the fan module 31 can have an opening. The open rear surface of the fan module 31 can be shielded by the flow guide 32, and a communication hole serving as an inlet of the fan module 31 can be defined at the flow guide 32. The air that has passed through the filter 33 can be introduced into the fan through the communication hole.

In some implementations, an air duct 102 can be defined between a side surface of the flow guide 32 and the air guide surface 1334. An entrance of the air duct 102 can be in fluid communication with an exit (or an outlet) of the fan module 31, and an exit of the air duct 102 can be in fluid communication with the outlet 101.

In some implementations, the outlet 101 can be located in the respiration space defined by the rear surface of the face guard 14 and the rear body 13. Therefore, the ambient air introduced by the fan module 31 can be discharged to the respiration space, so that the user can inhale air.

The air guide surface 1334 can be provided to be smoothly rounded from the exit of the fan module 31 toward the outlet 101, so that there is no abrupt change in a flow direction in the process in which the air discharged in the radial direction of the fan module 31 flows toward the outlet 101.

For example, in the case of a centrifugal fan, the axial intake and radial discharge are due to the shape of a conic or truncated conic hub. That is, the air introduced in the axial direction of the centrifugal fan is smoothly converted in a flow direction of 90 degrees along the rounded surface of the hub.

Here, since a rounding direction of the hub constituting the fan module 31 and a rounding direction of the air guide surface 1334 are the same, the air introduced into the fan module 31 can be smoothly changed in flow in only one direction.

If the intake grille 343 is provided on the front body 12, the inlet of the fan module 31 faces the front body 12, and as a result, the rounding direction of the hub of the fan module and the rounding direction of the air guide surface 1334 can be opposite to each other. As a result, the air discharged from the fan module 31 collides with a starting portion of the air guide surface 1334 corresponding to the entrance of the air duct 102 to cause flow resistance and flow noise.

For example, the air introduced in the axial direction of the fan module 31 substantially forms an S-shaped flow, so that flow loss is large, compared to the structure of the present disclosure that forms a C-shaped or n-shaped flow.

In some implementations, when the user exhales, the air discharged through the user's mouth and nose is collected in the respiration space. A minute portion of the air collected in the respiration space can be introduced into the pressure sensor mounting portion 130 through the through hole 1301.

In some implementations, most of the air collected in the respiration space descends and is discharged to the outside through the front surface exhaust port 1361 and the lower surface exhaust port 1362. Here, as the exhaust valve 21 is bent forward by pressure of air generated when the user exhales, the front surface exhaust port 1361 can be opened. Also, when the user breathes in, the pressure inside the respiration space can be lower than atmospheric pressure and the exhaust valve 21 can return to the original position to block the front surface exhaust port 1361.

Figure 10:
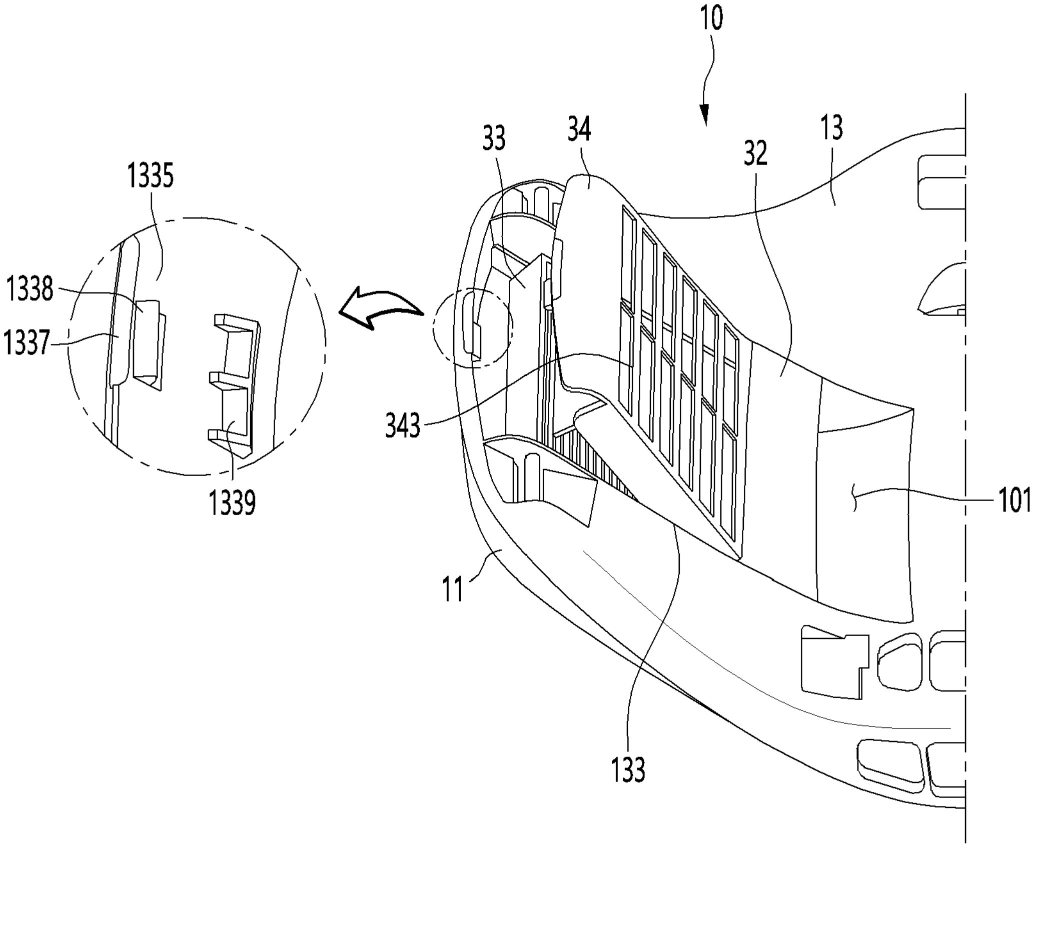
FIG. 10 is a diagram illustrating a partial rear perspective view of an exemplary mask apparatus depicting a coupling structure of a filter housing.

FIG. 10 is a diagram illustrating a partial rear perspective view of an exemplary mask apparatus depicting a coupling structure of a filter housing.

Referring to FIG. 10, the air cleaning module 30 of the mask apparatus 10 can include a filter housing 34, a filter 33, a flow guide 32, and a fan module 31 as described above.

For example, one end of the filter housing 34 can be rotatably coupled to the rear body 13, so that the filter 33 can be easily replaced.

In the fastening surface 1335 of the accommodation portion 133, a filter hook 1338 to which an end portion of the filter housing 34 is coupled and a flow guide hook 1339 to which an end portion of the flow guide 32 is coupled can be provided and can protrude from the fastening surface 1335.

In some implementations, when the flow guide is seated in the accommodation portion 133, and the filter housing 34 is coupled to the upper surface 1332 and the lower surface 1333 of the accommodation portion 133, the inlet and the outlet 101 through which ambient air is introduced and the outlet 101 through which ambient air is discharged are partitioned, and the air duct 102 can be provided in the accommodation portion 133.

Hereinafter, the structure and function of the filter housing 34 are described in detail with reference to the drawings.

Figure 11:
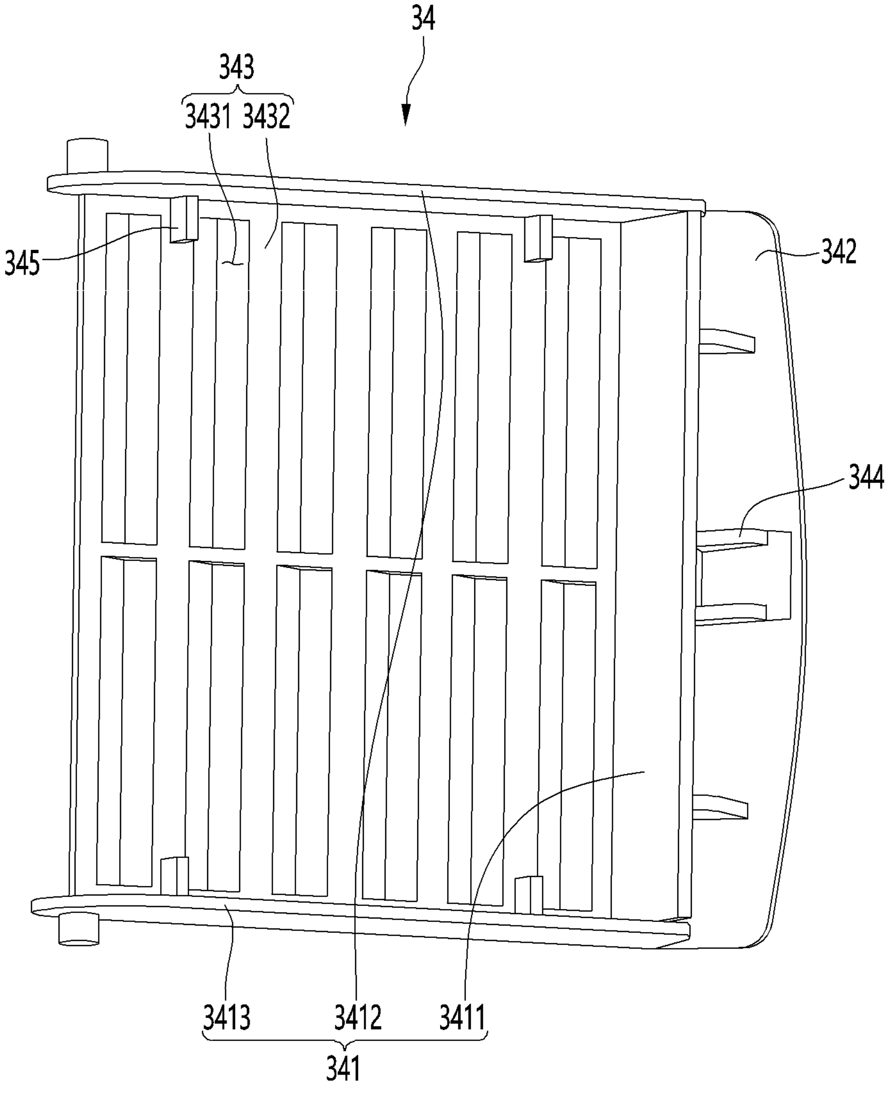
FIG. 11 is a diagram illustrating a front perspective view of a filter housing of an exemplary air cleaning module.
Figure 12:
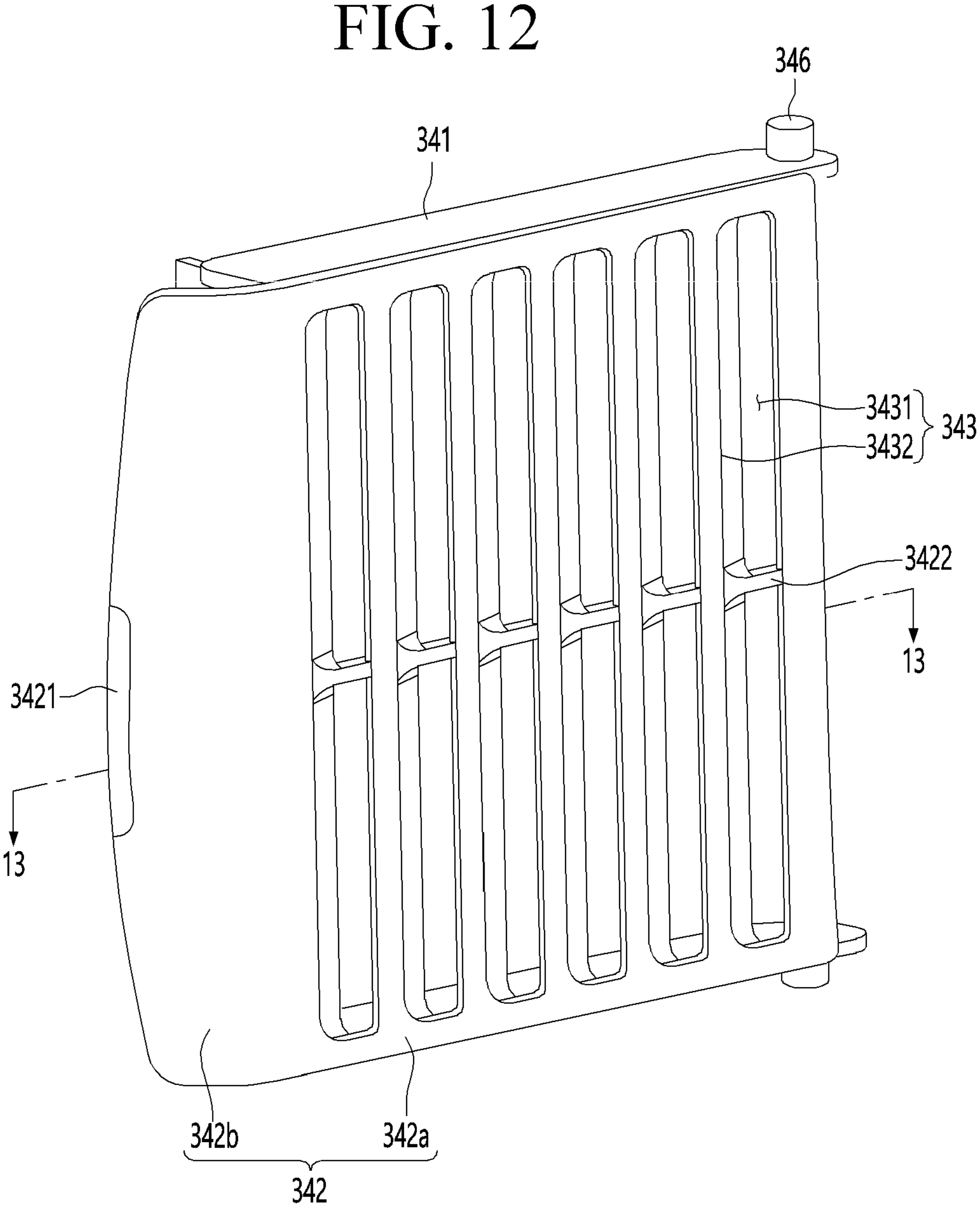
FIG. 12 is a diagram illustrating a rear perspective view of the filter housing.

FIG. 11 is a diagram illustrating a front perspective view of a filter housing of an air cleaning module, and FIG. 12 is a diagram illustrating a rear perspective view of the filter housing.

Referring to FIGS. 11 and 12, the front surface of the filter housing 34 faces the rear surface of the filter 33 seated on the rear surface of the flow guide 32, and the rear surface of the filter housing 34 defines a portion of the rear surface of the mask body 11. For example, when the user wears the mask apparatus 10, the rear surface of the filter housing 34 faces the user's face.

In detail, the filter housing 34 can include a filter frame 341 surrounding three sides of the filter 33 and a filter cover 342 provided on the rear surface of the filter frame 341.

The filter cover 342 can include a grille forming portion 342*a*, in which the intake grille 343 is provided and the filter frame 341 extends from a front surface thereof, and an extension portion 342*b* extending from one side end portion of the grille forming portion 342*a*.

The extension portion 342*b* can be provided to be smoothly rounded to fit a contour of the rear surface of the mask body 11. The grip recess 3421 can be provided at an end portion of the extension portion 342*b*. When the filter cover 342 is closed, the grip recess 3421 can abut on the grip recess 1337 provided at a side end portion of the rear body 13.

In some implementations, a fastening hook 344 protrudes from the center of the front surface of the extension portion 342*b*. When the filter cover 342 is closed, the fastening hook 344 can be caught by the filter hook 1338, so that the filter cover 342 can be coupled to the rear body 13.

A hinge 346 can protrude from an inner end portion of the filter housing 34.

For example, the filter frame 341 includes a side surface frame 3411 extending forward from the front surface of one side end portion of the grille forming portion 342*a*, an upper surface frame 3412 extending forward from a front surface of an upper end portion of the grille forming portion 342*a*, and a lower surface frame 3413 extending forward from a front surface of a lower end portion of the grille forming portion 342*a*. Accordingly, three sides of the filter 33 can be surrounded by the filter frame 341.

In some implementations, the fastening hook 344 can extend from the side surface frame 3411.

In addition, the side surface frame 3411 can be a boundary surface dividing the filter cover 342 into the grille forming portion 342*a* and the extension portion 342*b*.

The side surface frame 3411 can be connected to one end portion of the lower surface frame 3413, and a hinge 346 can extend from the other end portion. The pair of hinges 346 extending from the upper surface frame 3412 and the lower surface frame 3413 can be positioned on the same line and function as a rotational shaft.

In some implementations, the intake grille 343 can be provided in the grille forming portion 342*a*, and the intake grille 343 can include a plurality of intake slits 3431 and a plurality of partition ribs 3432. The plurality of intake slits and partition ribs 3432 can be divided into a plurality of intake regions by one or more reinforcing ribs 3422.

For example, the intake grille 343 can be divided into an upper intake grille (upper intake region) and a lower intake grille (lower intake region) by one reinforcing rib 3422. In some implementations, the intake grille 343 can be divided into an upper intake grille, a middle intake grille (middle intake region), and a lower intake grille.

As described above, the intake grille 343 may be described such that one large inlet defined in the grille forming portion 342*a* is divided into a plurality of long and narrow intake slits 3431 by the plurality of partition ribs 3432.

Alternatively, the intake grille 343 may be described as being provided by cutting a plurality of intake slits 3431 at regular intervals in the grille forming portion 342*a*.

In the present disclosure, it should be appreciated that the inlet of the mask apparatus 10 or the inlet of the mask body 11 refers to the intake grille 343.

In some implementations, a plurality of filter pressing ribs 345 can protrude from an edge of a front surface of the grille forming portion 342*a*, specifically, a point at which the upper surface frame 3412 and the grille forming portion 342*a* intersect and a point at which the lower surface frame 3413 and the grille forming portion 342*a* intersects.

The plurality of filter pressing ribs 345 can press an edge of the rear surface of the filter 33 seated on the flow guide 32 to block the filter 33 from moving.

Figure 13:
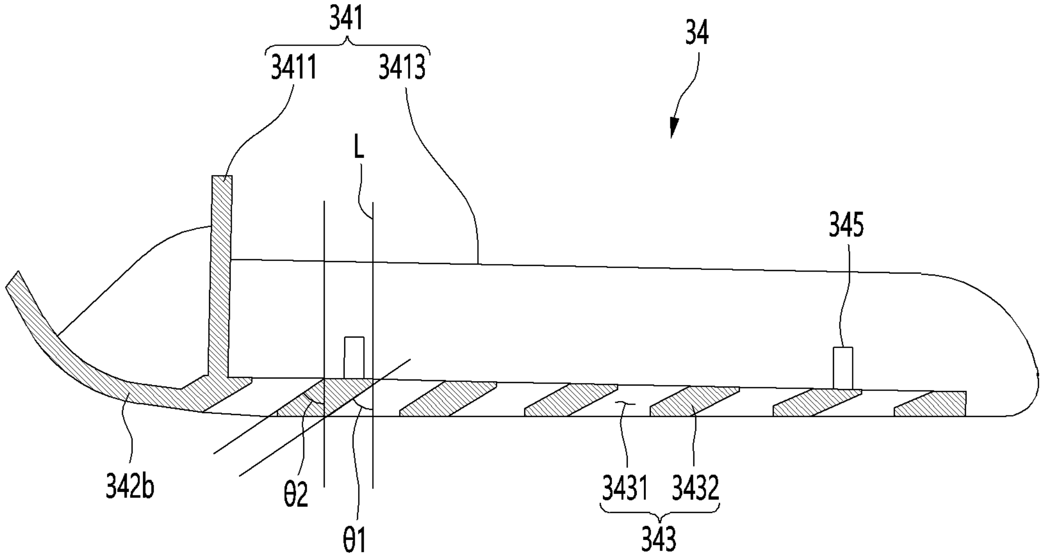
FIG. 13 is a diagram illustrating a cross-sectional view of the filter housing taken along line 13-13 of FIG. 12.

FIG. 13 is a diagram illustrating a cross-sectional view of a filter housing taken along line 13-13 of FIG. 12.

Referring to FIG. 13, the intake grille 343 is provided in the grille forming portion 342*a* of the filter cover 342, and the intake grille 343 includes a plurality of intake slits 3431 and a plurality of compartment ribs 3432.

For examples, it is preferable in terms of a filtering function and a life of the filter that ambient air introduced through the intake grille 343 toward the filter 33 evenly passes through the entire region of the filter 33, rather than concentratedly passing through a specific region of the filter 33.

When the ambient air passes through only a specific region of the filter 33, foreign substances are accumulated only in the corresponding passage region, thereby deteriorating the filtering function and reducing a filter replacement cycle.

In order to prevent this problem, it is necessary to allow the ambient air passing through the intake grille 343 to spread evenly over the entire region of the filter 33 if possible. To this end, inclinations of the partition ribs 3432 constituting the intake grille 343 may be designed to be different.

For example, each of the partition ribs 3432 can include an entrance surface defining a portion of the rear surface of the mask body 11, an exit surface corresponding to the opposite surface of the entrance surface, and a first side surface and a second side surface.

The second side surface may refer to a side surface closer to the outer side than the first side, that is, closer to the extension portion 342*b*.

In some implementations, each of the first side surface and the second side surface is inclined at a predetermined angle with respect to a line (L, hereinafter, a reference line) perpendicular to the entrance surface or the exit surface. In addition, a first inclination angle θ1 between the first side surface and the reference line and a second inclination angle θ2 between the second side surface and the reference line L can be set to be different from each other. For example, the first inclination angle θ1 can be set to be greater than the second inclination angle θ2.

In some implementations, the plurality of first inclination angles θ1 respectively corresponding to the plurality of partition ribs 3432 can be designed to increase away from the extension portion 342*b*. This may be equally applied to the plurality of second inclination angles θ2.

Further, a first inclination angle of any one of the adjacent partition ribs 3432 and a second inclination angle of the other facing the first inclination angle can be designed to be the same. For example, two opposite sides of the partition ribs 3432 adjacent to each other can be designed to be parallel to each other. This means that a width of the intake slit 3431 provided between the adjacent partition ribs 3432 can be designed to be constant in an air inflow direction.

However, since the size of the inclination angle increases away from the extension portion 342*b*, the angle between the intake slit 3431 and the reference line L increases away from the extension portion 342*b*.

According to the inlet structure, there is an effect that the ambient air passing through the intake slits 3431 passes while evenly colliding with the entire surface of the filter 33.

Figure 14:
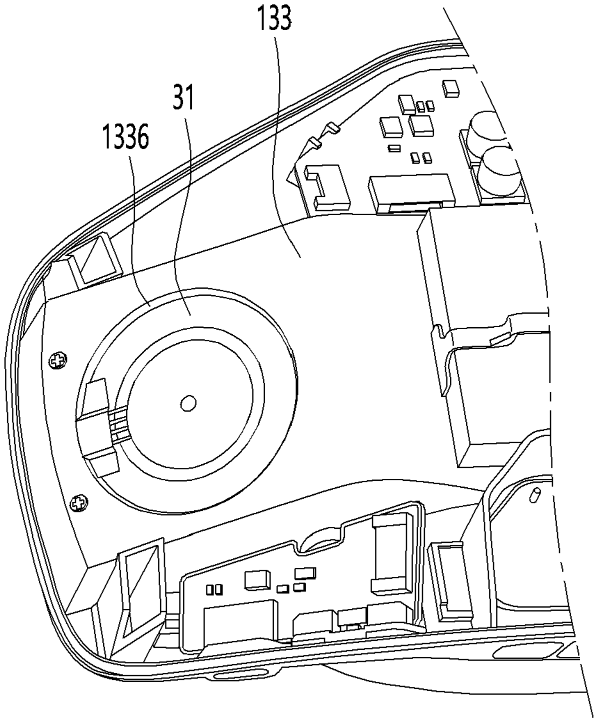
FIG. 14 is a diagram illustrating a partial perspective view of an exemplary mask apparatus depicting a state in which a fan module of an air cleaning module is mounted in an accommodation portion of a rear body.
Figure 15:
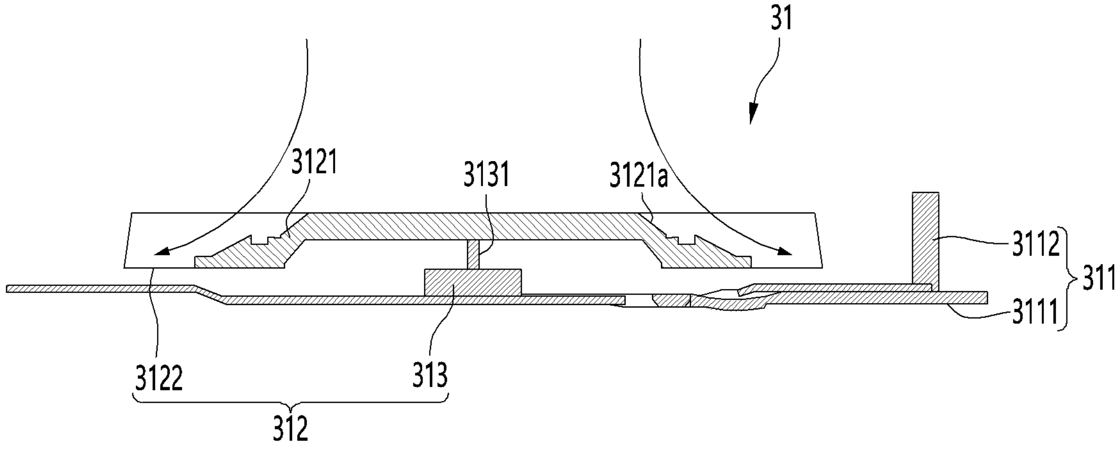
FIG. 15 is a diagram illustrating a cross-sectional view of the fan module.
Figure 16:
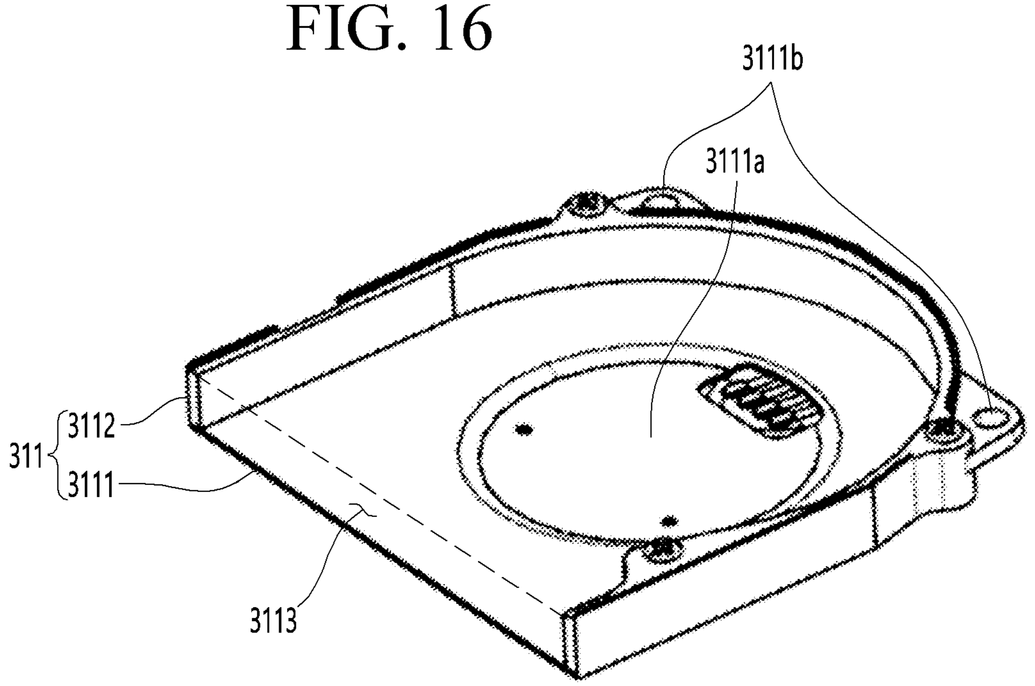
FIG. 16 is a diagram illustrating a perspective view of a fan housing of a fan module.

FIG. 14 is a diagram illustrating a partial perspective view of an exemplary mask apparatus depicting a state in which a fan module constituting an air cleaning module is mounted in an accommodation portion of a rear body, FIG. 15 is a diagram illustrating a cross-sectional view of the fan module, and FIG. 16 is a diagram illustrating a perspective view of a fan housing of a fan module.

Referring to FIGS. 14 to 16, the air cleaning module 30 can include a fan module 31.

For example, the fan module 31 can include a fan housing 311, a fan 312 mounted in the fan housing 311, and a motor 313 rotating the fan 312. In some implementations, the fan housing 311 includes a base 3111 seated on the seating surface 1331 of the accommodation portion 133 and a shroud 3112 protruding from the edge of the base 3111 to a predetermined height. The shroud 3112 extends along an edge of the base 3111, and a middle portion thereof extends roundly along the periphery of the fan 312.

The shroud 3112 can extend in a straight line from one edge of one end portion of the base 3111, extend to be rounded with a predetermined curvature along the periphery of the fan 312 at a certain point, and then extend in a straight line to the other edge of one end portion of the base 3111. An outlet 3113 can be provided at one end portion of the fan housing 311 by coupling of the shroud 3112 and the base 3111.

The base 3111 can include a circular motor seating portion 3111*a*, and the motor seating portion 3111*a* can be fitted into the fan mounting hole 1336 defined in the seating surface 1331.

In some implementations, boss through-holes 3111*b* can be defined at both corners of the other end portion of the base 3111, respectively. Here, the other end portion of the base 3111 can be defined as an end portion opposite to the one end portion at which the outlet 3113 is provided.

Since the shroud 3112 is provided to be rounded in an arc shape along the periphery of the fan 312 at the other end portion of the base 3111, a sufficient extra space is defined for the boss through-hole 3111*b* to be provided at the two corners of the other end portion of the base 3111.

The upper surface of the fan housing 311 corresponding to the opposite side of the base 3111 can be opened, and the opened upper surface of the fan housing 311 can be shielded by the flow guide 32. Accordingly, the outlet 3113 having a complete rectangular shape can be provided by the base 3111, the shroud 3112, and the flow guide 32.

In some implementations, the fan 312 includes a hub 3121 connected to a rotational shaft 3131 of the motor 313 and a plurality of blades 3122 extending from an upper surface of the hub 3121 and arranged at a certain interval in a circumferential direction of the hub 3121.

The hub 3121 has a flow change surface 3121*a* defined to be concavely rounded with a predetermined curvature in order to guide the air introduced in the direction of the rotational shaft 3131 to be discharged in the radial direction of the fan 312.

The flow change surface 3121*a* can start from the center of the fan 312 into which the rotational shaft 3131 is fitted, and as depicted, the flow change surface 3121*a* can start from a point spaced apart from the center of the fan 312 in a radial direction. In some implementations, a flat surface can be provided from the center of the fan 312 to the starting point of the flow change surface 3121*a*.

Under the condition that a thickness of the fan 312 may be sufficiently large, the flow change surface 3121*a* can be started at a point as close as possible to the center of the fan 312, but under the condition that a fan as flat as possible should be used as in the case of the present disclosure, the flow change surface 3121*a* should start at a point spaced apart from the center of the fan 312, and as a result, a length of the flow change surface 3121*a* is inevitably decreased.

In some implementations, a maximum height of the blade 3122 can have a length corresponding to a thickness of the fan 312. In addition, an outer diameter of the blade 3122 can be equal to or greater than an outer diameter of the hub 3121.

When the fan module 31 is mounted on the accommodation portion 133, the rotational shaft 3131 can extend from the front body 12 toward the rear body 13, and ambient air can be supplied in a direction opposite to the extension direction of the rotational shaft 3131 and can move in a radial direction along the surface of the hub 3121 to be guided to the outlet 3113.

The motor seating portion 311*a* can protrude from one surface of the base 3111 on which the shroud 3112 is provided toward the other surface by a forming process. Accordingly, as the motor seating portion 311*a* is fitted into the fan mounting hole 1336 defined in the accommodation portion 133, primary shaking can be reduced. In addition, shaking can be reduced secondarily by a fastening member passing through the boss through hole 3111*b*.

Figure 17:
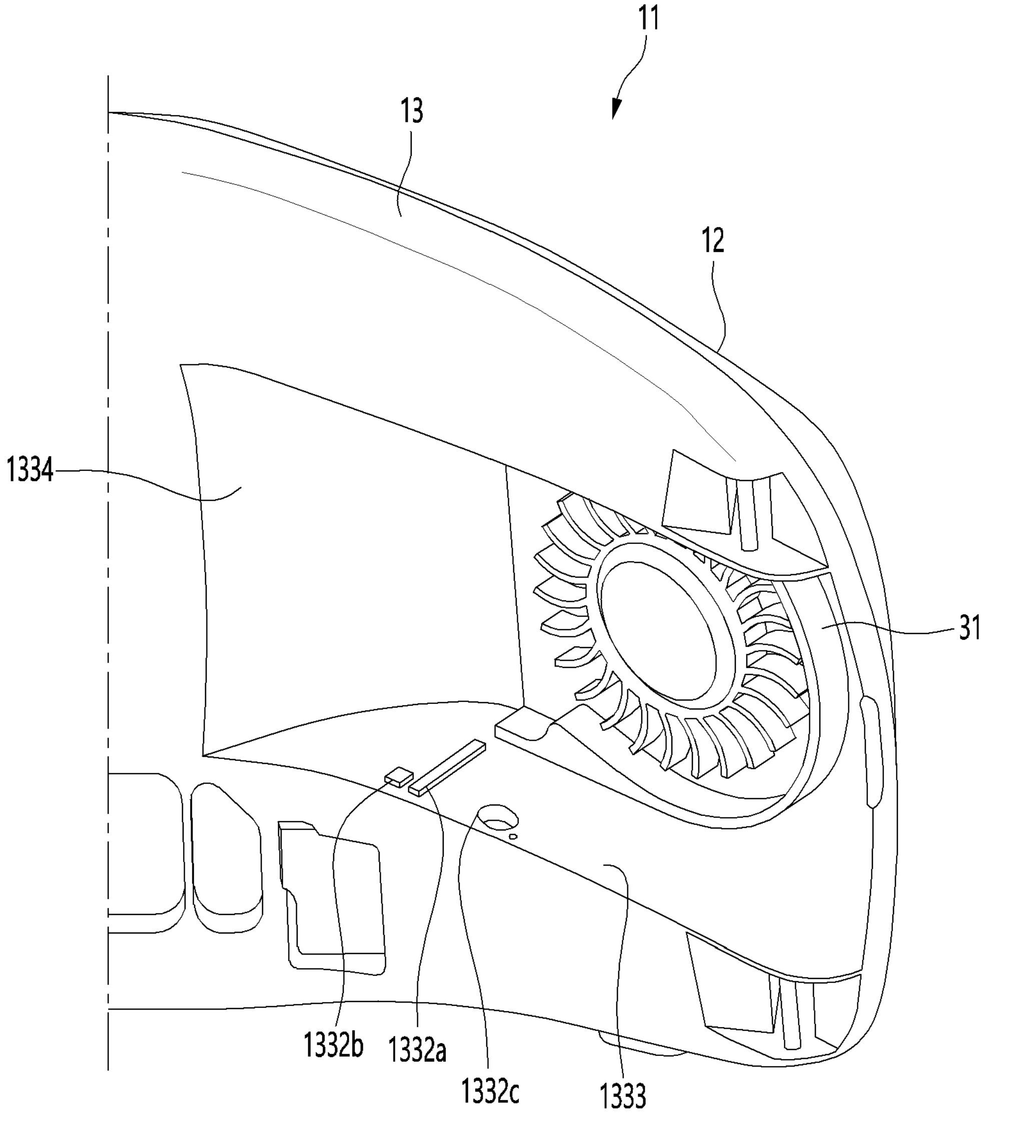
FIG. 17 is a diagram illustrating a partial perspective view of an exemplary mask apparatus showing a structure of a lower surface of an accommodation portion of a rear body.
Figure 18:
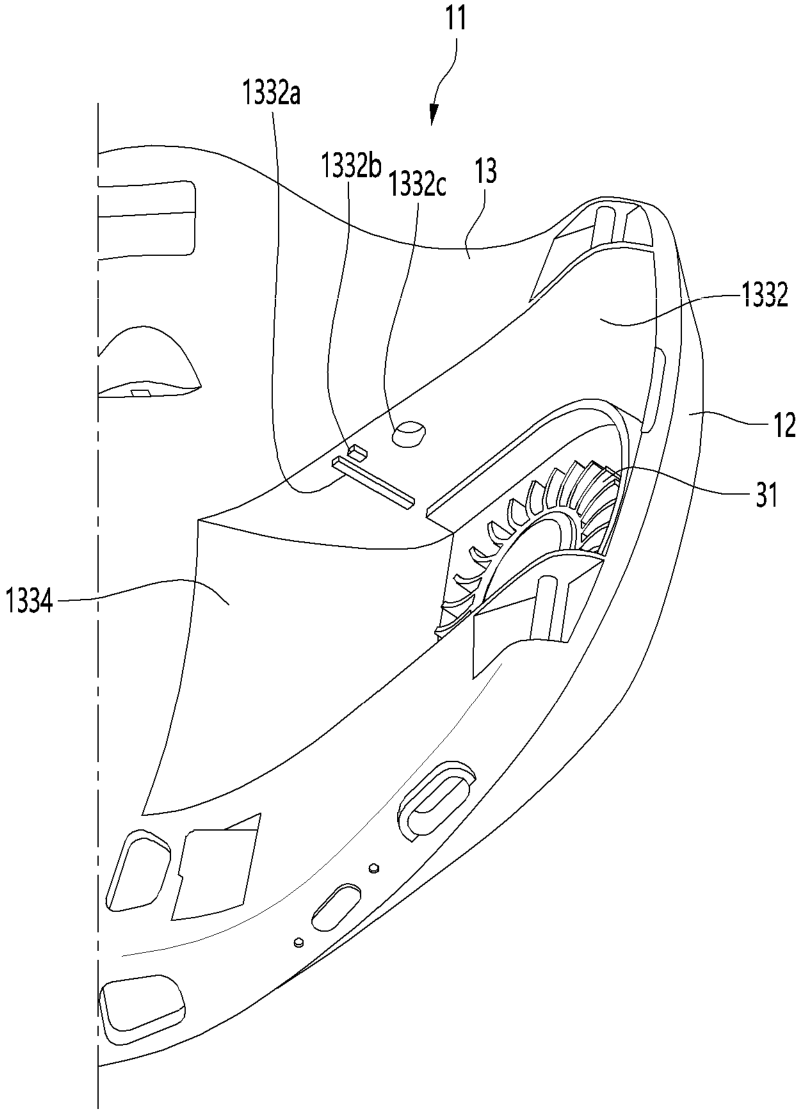
FIG. 18 is a diagram illustrating a partial perspective view of an exemplary mask apparatus showing a structure of an upper surface of the accommodation portion.

FIG. 17 is a diagram illustrating a partial perspective view of an exemplary mask apparatus depicting a structure of a lower surface of an accommodation portion of a rear body, and FIG. 18 is a diagram illustrating a partial perspective view of an exemplary mask apparatus depicting a structure of an upper surface of the accommodation portion.

Referring to FIGS. 17 and 18, the base 3111 of the fan module 31 can be seated on the seating surface of the accommodation portion 133, and the open surface of the fan module 31 corresponding to the opposite surface of the base 3111 can face the rear of the rear body 13. In this state, the flow guide 32 can be mounted to shield the open surface of the fan module 31, and the outlet 3113 of the fan module 31 can face the air guide surface 1334 of the accommodation portion 133.

For example, a mounting guide 1332*a*, a fixing guide 1332*b*, and a hinge hole 1332*c* can be provided in each of the upper surface 1332 and the lower surface 1333 of the accommodation portion 133.

The mounting guide 1332*a* can be provided in the form of a rib extending by a predetermined length from the rear surface of the mask body 11 in a forward direction. The fixing guide 1332*b* can be provided in the form of a protrusion protruding from a point spaced apart from the mounting guide 1332*a* in the center direction of the mask body 11.

In some implementations, the hinge hole 1332*c* is provided in the form of a long hole at a point spaced apart from the mounting guide 1332*a* toward a side end portion of the mask body 11. The hinge hole 1332*c* can be a hole into which the hinge 346 of the filter housing 34 is inserted, and can have a non-circular shape, for example, an elliptical shape.

In some implementations, the hinge hole 1332*c* can extend in a direction closer to the rear surface of the mask body 11 toward the side end portion of the mask body 11. For example, when the elliptical hinge hole 1332*c* is designed, a distance from one end portion of the hinge hole 1332*c* close to the center of the mask body 11 to the rear surface of the mask body 11 can be designed to be longer than a distance from the other end portion of the hinge hole 1332*c* close to the side end portion of the mask body 11 to the rear surface of the mask body 11.

This is to allow the filter housing 34 not to interfere with a rear flange 325 (depicted in FIG. 19) of the flow guide 32 when the filter housing 34 is rotated to remove the filter 33 as depicted in FIG. 10.

For example, when the filter housing 34 is rotated in a state in which the fastening hook 344 of the filter housing 34 is separated from the filter hook 1338, the filter housing 34 is rotated, while being pulled toward a side end portion of the mask body 11. Then, the hinge 346 of the filter housing 34 can rotate, while moving from one end portion of the long-hole-shaped hinge hole 1332*c* toward the other end portion.

According to the structure of the hinge hole 1332*c* of the present disclosure, a rotation amount (or opening angle) of the filter housing 34 can be increased than the structure that the hinge hole 1332*c* is circular or the hinge hole 1332*c* extends parallel to the rear surface of the mask body 11. As a result, the mounting and dismounting of the filter 33 may be made much more easily.

The functions and effects of the mounting guide 1332*a* and the fixing guide 1332*b* will be described in detail together with a description of the structure and function of the flow guide below.

Figure 19:
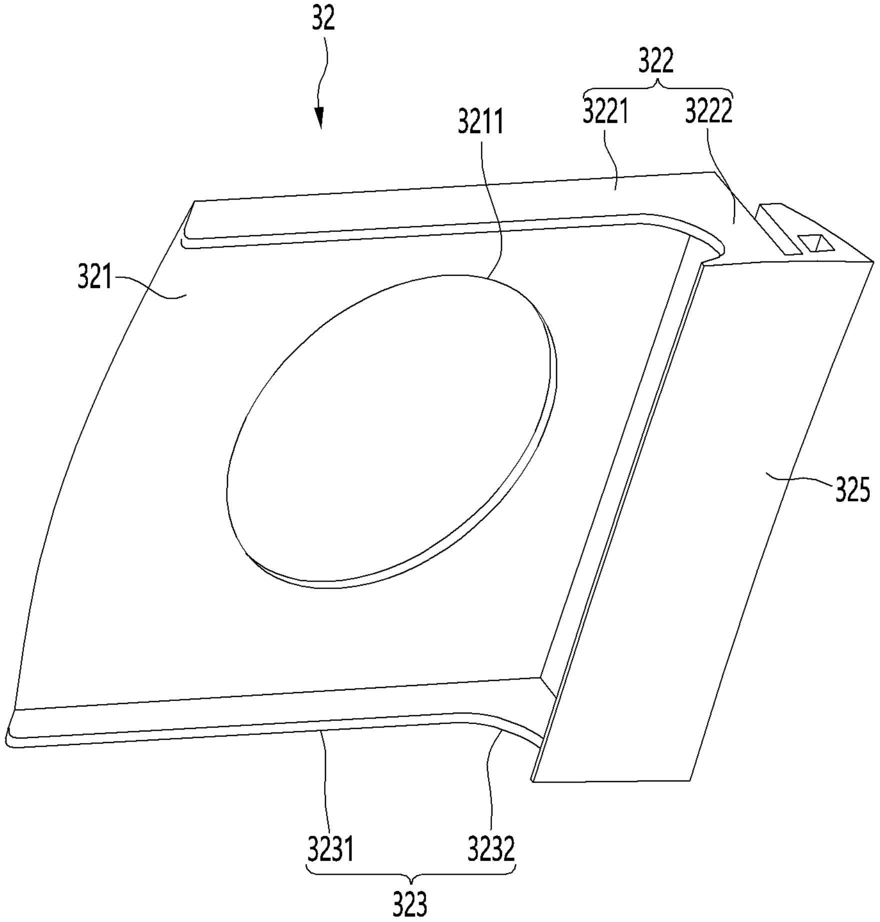
FIG. 19 is a diagram illustrating a rear perspective view of a flow guide of an air cleaning module.
Figure 20:
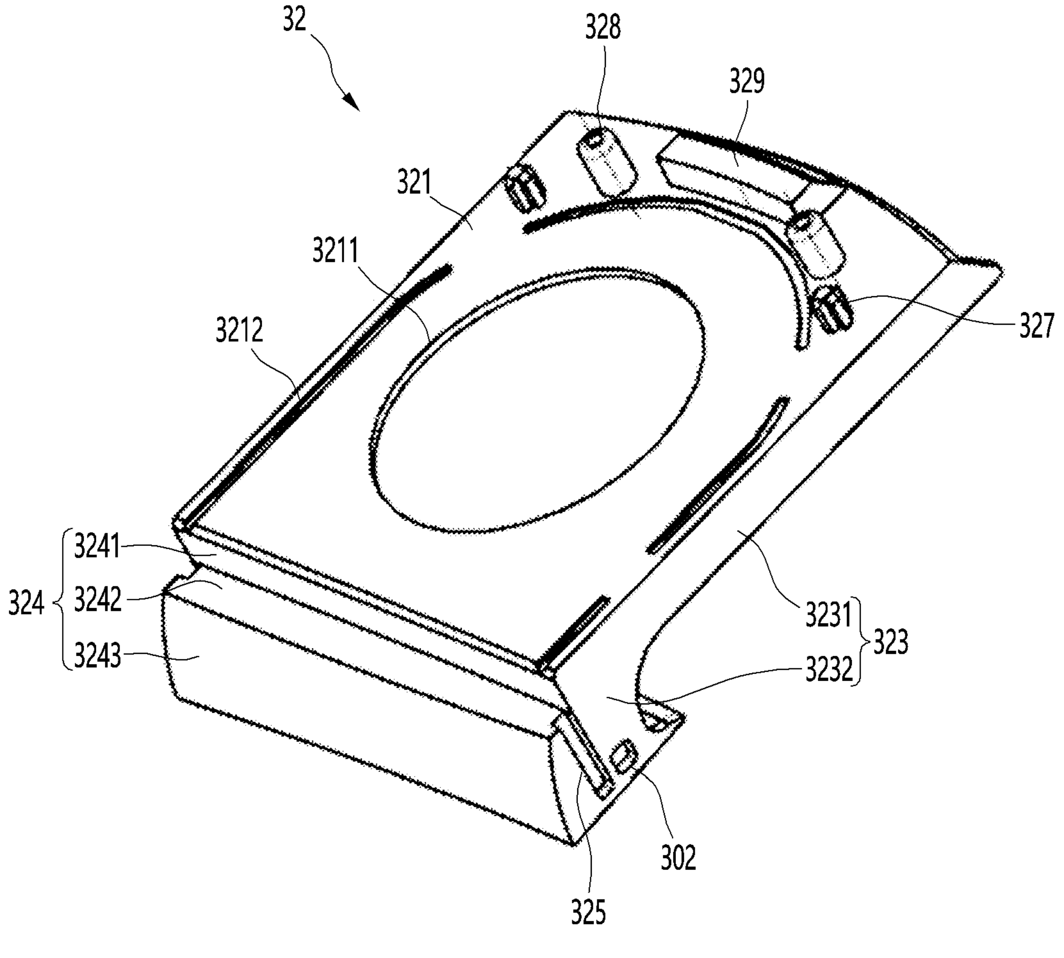
FIG. 20 is a diagram illustrating a front perspective view of the flow guide.
Figure 21:
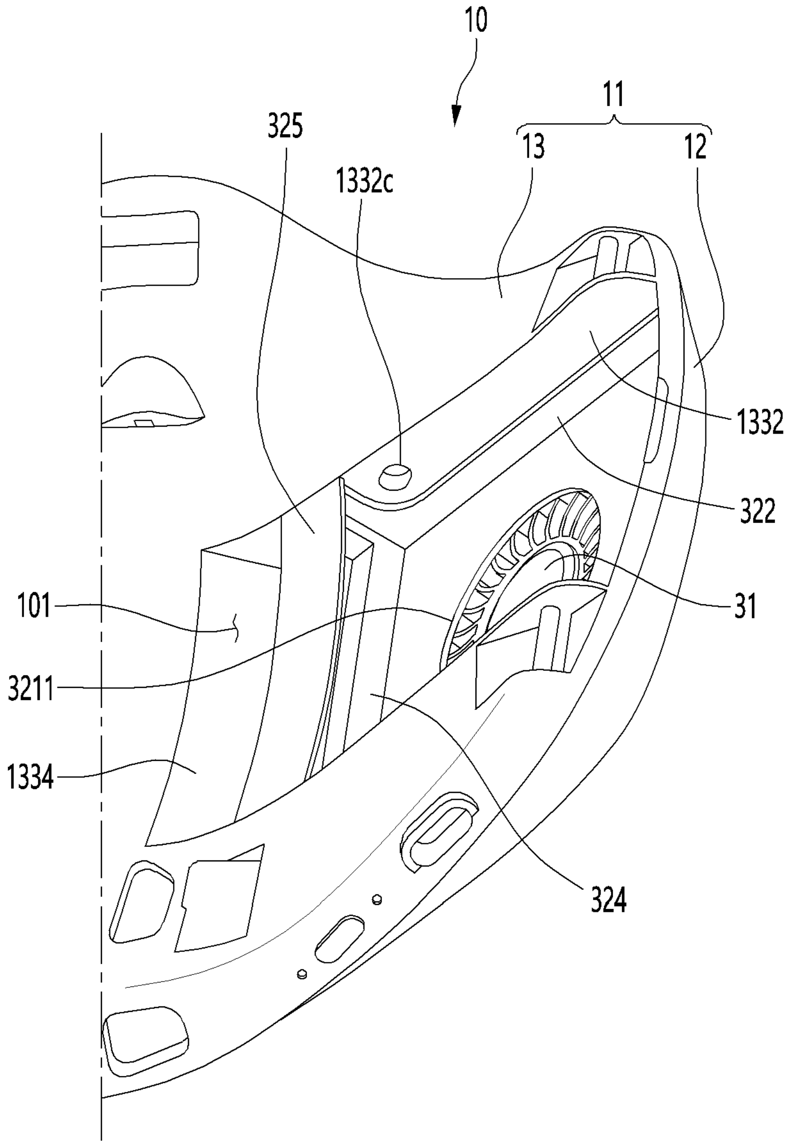
FIG. 21 is a diagram illustrating a partial perspective view of an exemplary mask apparatus showing a state in which the flow guide is mounted in the accommodation portion of a mask body.

FIG. 19 is a diagram illustrating a rear perspective view of a flow guide of an air cleaning module, FIG. 20 is a diagram illustrating a front perspective view of the flow guide, and FIG. 21 is a diagram illustrating a partial perspective view of an exemplary mask apparatus depicting a configuration in which the flow guide is mounted in the accommodation portion of the mask body.

Referring to FIGS. 19 to 21, the front surface of the flow guide 32 is defined as a surface to be seated on the fan housing 311, and the rear surface of the flow guide 32 is defined as a surface on which the filter 33 is seated.

For example, the flow guide 32 includes a mount plate 321 covering the open rear surface of the fan housing 311, a duct flange 324 bent and extending from one end of the mount plate 321, an upper flange 322 bent and extending from an upper end of the mount plate 321 and the duct flange 324, a lower flange 323 bent and extending from a lower end of the mount plate 321 and the duct flange 324, and a rear flange 325 extending in a direction crossing the duct flange 324 from an end portion of the duct flange 324.

The other end of the mount plate 321 can be in close contact with the fastening surface 1335 of the accommodation portion 133. In some implementations, a communication hole 3211 can be defined in the mount plate 321, and the communication hole 3211 can function as an inlet of the fan module 31.

The upper flange 322 can include a mount upper flange 3221 and a duct upper flange 3222.

The mount upper flange 3221 can be vertically bent at an upper end of the mount plate 321 and extends with a predetermined width. The duct upper flange 3222 can be vertically bent from an upper end of the duct flange 324 with a predetermined width. The mount upper flange 3221 and the duct upper flange 3222 can be provided as one body to form an L-shape.

The lower flange 323 can include a mount lower flange 3231 and a duct lower flange 3232.

The mount lower flange 3231 is vertically bent from a lower end of the mount plate 321 and extends with a predetermined width. The duct lower flange 3232 is vertically bent from a lower end of the duct flange 324 and extends with a predetermined width.

The upper flange 322 and the lower flange 323 are formed to be symmetrical with respect to a line or a plane that bisects the mount plate 321 up and down.

The upper flange 322 can be in close contact with an upper surface 1332 of the accommodation portion 133, and the lower flange 323 can be in close contact with a lower surface 1333 of the accommodation portion 133. Also, when the flow guide 32 is seated in the accommodation portion 133, as depicted in FIG. 8, the duct flange 324 can define the rear surface of the air duct 102 and the air guide surface 1334 of the accommodation portion 133 can define the front surface of the air duct 102.

The rear flange 325 can provide a portion of the rear surface of the mask body 11 when the flow guide 32 is mounted on the accommodation portion 133, as depicted in FIG. 10. Also, one side end portion of the rear flange 325 can be in contact with a side end portion of the filter cover 342, specifically, the side end portion on which the hinge 346 is provided, and the other side end portion of the rear flange 325 provides a side end portion of the outlet 101.

For example, the outlet 101 defined as an exit end of the air duct 102 may be understood as being defined by the end portion of the air guide surface 1334 of the accommodation portion 133 and the other side end portion of the rear flange 325.

In some implementations, a space accommodating the filter 33 is defined by the mount plate 321, the duct flange 324, the upper flange 322, the lower flange 323, and a portion of the rear flange 325. Specifically, the front surface of the filter 33 can be placed on the rear surface of the mount plate 321, and the rear surface of the filter 33 can face the filter cover 342 of the filter housing 34.

For example, the upper flange 322 and the lower flange 323 support a portion of an upper side surface and a portion of a lower side surface among four side surfaces of the filter 33, respectively, so that the filter can be blocked from moving in an up-down direction in a state in which the user wears the mask apparatus 10.

In some implementations, the duct flange 324 includes a filter support surface 3241 bent and extending from a side end portion of the mount plate 321 to support a portion of the side surface of the filter 33, a bent surface 3242 bent and extending from an end portion of the filter support surface 3241, and an air guide surface 3243 rounded with a predetermined curvature from an end portion of the bent surface 3242.

The air guide surface 3243 of the duct flange 324 can be provided at a position facing the air guide surface 1334 that constitutes the accommodation portion 133, and the front and rear surfaces of the air duct 102 are defined by the two air guide surfaces 3243 and 1334.

Due to the rounded shape of the air guide surface 3243, the air duct 102 may have a shape in which a cross-sectional area increases from an inlet that is in fluid communication with the outlet of the fan module 31 toward the outlet 101.

In some implementations, a guide recess 3201 and a fixing recess 3202 can be provided at each of the duct upper flange 3222 of the upper flange 322 and the duct lower flange 3232 of the lower flange 323.

The guide recess 3201 can be provided from the bent surface 3242 to a point spaced downward from the rear flange 325. When the flow guide 32 is mounted on the accommodation portion 133, the mounting guide **1332*a* can be slidably inserted into the guide recess 3201**.

In some implementations, the mounting guide **1332*a* can be provided in the duct upper flange 3222 of the flow guide 32, and the guide recess 3201 can be provided on each of an upper surface 1332 and the lower surface 1333** of the accommodation portion.

As the mounting guide **1332*a* is inserted into the guide recess 3201, it is possible to reduce leakage of a portion of the air discharged from the fan module 31 to the air duct 102. For example, a phenomenon that a portion of the air discharged to the air duct 102 is leaked through a gap between the upper surface 1332 of the accommodation portion 133 and the upper flange 322 of the flow guide 32 and a gap between the lower surface 1333 of the accommodation portion 133 and the lower flange 323 of the flow guide 32** can be reduced.

In some implementations, the fixing guide **1332*b* is press-fitted to the fixing recess 3202, so that the flow guide 32 can be coupled to the accommodation portion 133 without shaking. In some implementations, the positions of the fixing guide 1332*b* and the fixing recess 3202 can be interchanged with each other like the mounting guide 1332*a* and the guide recess 3201**.

In some implementations, a fan support rib 3212 can be provided on the front surface of the mount plate 321, that is, a surface covering the open surface of the fan housing 311.

For example, the fan support rib 3212 protrudes along the shape of the shroud 3112 of the fan housing 311 and extends along an outer surface of the shroud 3112 to stably support the fan housing 311. The communication hole 3211 can be defined in an inner region of the fan support rib 3212.

In some implementations, a fan fixing boss 327 can protrude from an edge of a front surface of the mount plate 321 corresponding to an outer region of the fan support rib 3212. The fan fixing boss 327 can include a first fan fixing boss provided on an upper edge of the outer side end portion of the mount plate 321 and a second fan fixing boss provided on a lower edge of the mount plate 321. The outer side end portion of the mount plate 321 may be understood to refer to an end portion in close contact with the fastening surface 1335 of the accommodation portion 133.

In some implementations, a fastening boss 328 protrudes from any point spaced apart from the fan fixing boss 327. The fastening boss 328 can couple the flow guide 32 to the seating surface 1331 of the accommodation portion 133.

The fastening boss 328 can include a first fastening boss provided at a point spaced apart from the first fan fixing boss, and a second fastening boss provided at a point spaced apart from the second fan fixing boss. It should be noted that the numbers of the fastening boss 328 and the fan fixing boss 327 are not limited.

In some implementations, a fastening hook 329 can protrude from an outer edge of the front surface of the mount plate 321, that is, in a region adjacent to the outer side end portion of the mount plate 321. The fastening hook 329 can be coupled to the flow guide hook 1339 (depicted in FIG. 10) protruding from the fastening surface 1335 of the accommodation portion 133 to block the flow guide 32 from being detached.

Here, the fastening hook 329, the fastening boss 328, and the fan fixing boss 327 can be provided to be symmetrical based on a line bisecting the mount plate 321 up and down.

Figure 22:
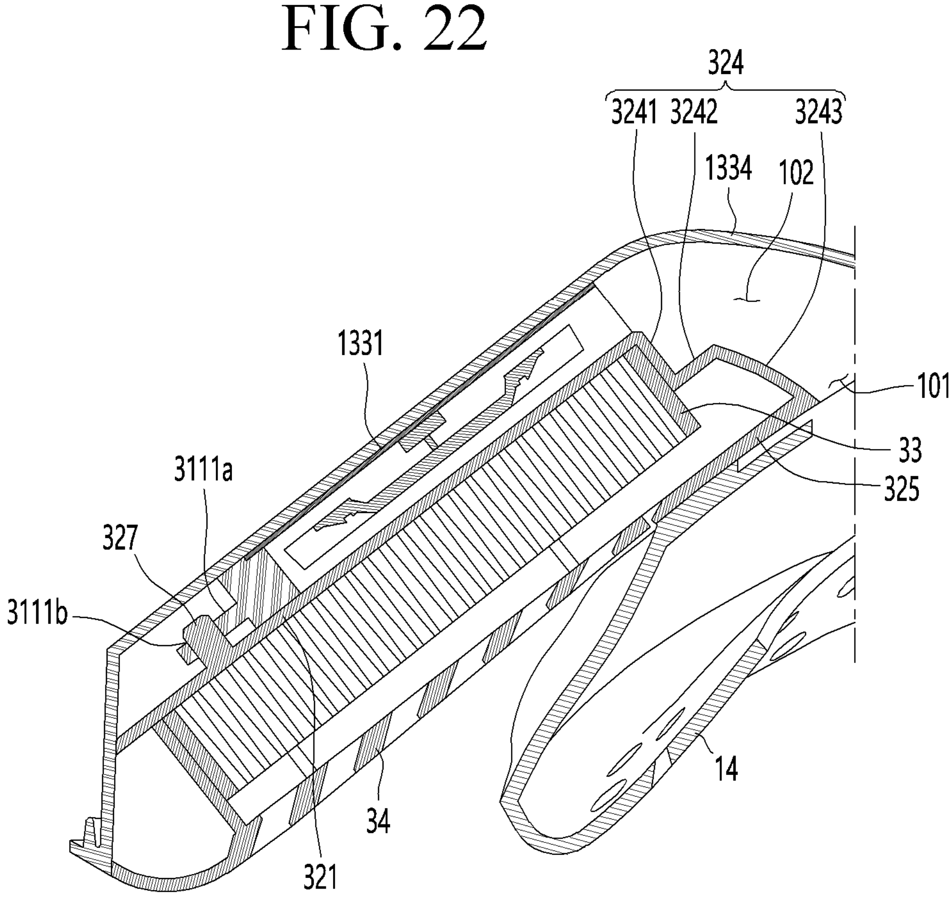
FIG. 22 is a diagram illustrating a partial cross-sectional view of the exemplary mask apparatus depicting a coupling structure of the fan module and the fan fixing boss.

FIG. 22 is a diagram illustrating a partial cross-sectional view of the exemplary mask apparatus depicting a coupling structure of a fan module and a fan fixing boss.

Referring to FIGS. 16 and 20 to 22, boss through holes **3111*b* can be defined at two corners of the base 3111 of the fan housing 311. For example, the boss through hole 3111*b* can be defined at an end portion opposite to the end portion at which the outlet 3113 of the fan module 31** is provided.

When the flow guide 32 is mounted in the accommodation portion 133 in a state in which the fan module 31 is mounted on the seating surface 1331 of the accommodation portion 133, the fan fixing boss 327 can be inserted into the boss through hole **3111*b***.

Figure 23:
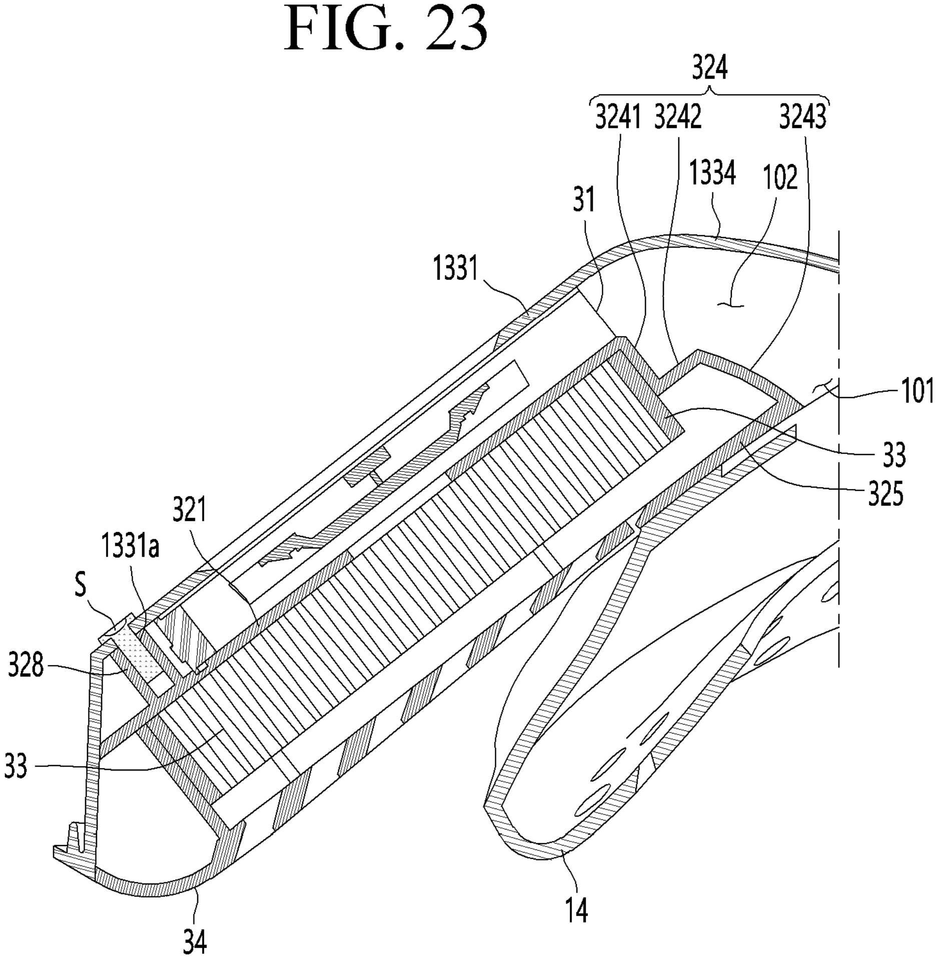
FIG. 23 is a diagram illustrating a partial cross-sectional view of the exemplary mask apparatus depicting a coupling structure of a flow guide and a mask body.

FIG. 23 is a diagram illustrating a partial cross-sectional view of an exemplary mask apparatus depicting a coupling structure of a flow guide and a mask body.

Referring to FIGS. 7, 20, and 23, when the fan module 31 and the flow guide 32 are sequentially mounted in the accommodation portion 133, an end portion of the fastening boss 328 protruding from the front surface of the flow guide 32 can be aligned with the flow guide fastening hole 1331*a* defined at the edge of the seating surface 1331 of the accommodation portion 133.

In this state, a fastening member such as a screw can pass through the flow guide fastening hole 1331*a* and can be inserted into the upper fastening boss 328, so that the flow guide 32 is stably coupled to the accommodation portion 133.

For example, the flow guide 32 can be stably coupled to the accommodation portion 133, without shaking, coupled by coupling of a fastening member inserted into the fastening boss 328, coupling between the mounting guide 1332*a* and the guide recess 3201, and coupling between the fixing guide 1332*b* and the fixing recess 3202.

Figure 24:
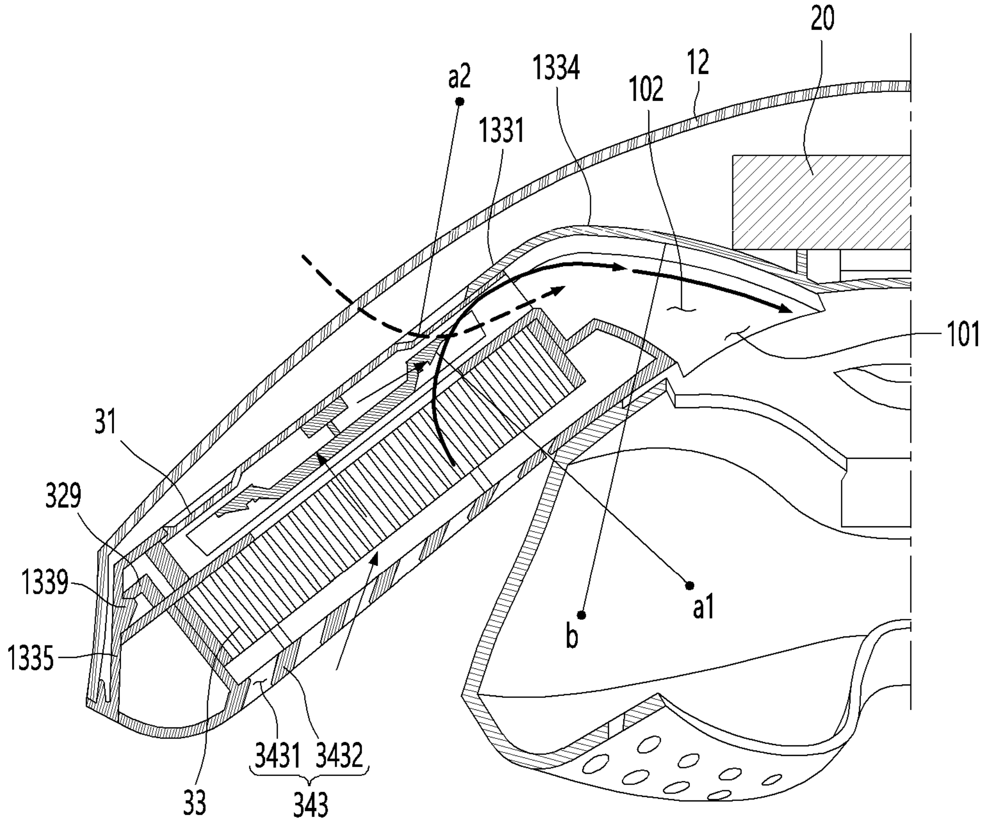
FIG. 24 is a diagram illustrating a cross-sectional view of a flow of air in an exemplary mask apparatus having a rear intake and rear discharge structure.

FIG. 24 is a diagram illustrating a cross-sectional view of a flow of air in an exemplary mask apparatus having a rear intake and rear discharge structure.

Referring to FIG. 24, as described above, in the mask apparatus 10, intake and discharge of ambient air are made from the rear surface of the mask body 11. In some implementations, the inlet provided on the rear surface of the mask body 11 can be provided in the form of an intake grille.

For example, the ambient air introduced through the intake slit 3431 of the intake grille 343 obliquely collides with the rear surface of the filter 33 due to the side inclination of the partition rib 3432 and then passes through the filter 33.

In a state in which the user wears the mask apparatus 10, a distance between the user's face and the intake grille 343 may be narrow. Accordingly, when both side surfaces of the partition rib 3432 are perpendicular to the rear surface, a flow direction of the ambient air can be bent by 90 degrees to increase flow resistance. In order to minimize the flow resistance, the side surface of the partition rib 3432 can be inclined, thereby reducing the flow change angle occurring when ambient air is introduced to lower the flow resistance.

In the case of a mask apparatus having a structure in which the inlet is provided on the entire surface of the mask body, there is an advantage of reducing the flow resistance, but there is a disadvantage that the inlet is exposed to the outside as it is and does not look good aesthetically. In addition, foreign substances or flying insects may be directly introduced into the inlet while the user is walking or running, thereby clogging the front of the filter, and as a result, the life of the filter is shortened or the filter replacement cycle is shortened.

In some implementations, the ambient air that has passed through the filter 33 is introduced in the axial direction of the fan module 31 and then is converted by about 90 degrees in the radial direction. Here, the flow direction of the air introduced in the axial direction is smoothly changed along the rounded surface of the hub 3121.

For example, a flow trace of the air introduced in the axial direction of the fan module 31 and discharged in the radial direction may be indicated by the solid arrow, and the center of curvature a1 of the flow trace of the introduced air may be understood as being located on the rear side of the mask body 11.

Also, the air leaving the outlet of the fan module 31 is directly guided to the outlet 101 along the air guide surface 1334. Here, the air guide surface 1334 may also be provided to be rounded with a predetermined curvature, and it may be understood that the center of curvature b of the air guide surface 1334 is also located on the rear side of the mask body 11. Since both the center of curvature a1 of the flow trace of the air passing through the fan module 31 and the center of curvature b of the air guide surface 1334 are located on the rear side of the mask body 11, the two centers of curvature a1 and b can be defined as being located in the same region.

As described above, since the center of curvature of the flow trace of the air passing through the fan module 31 and center of curvature of the flow trace of the air discharged along the air guide surface 1334 are located in the same region, the air flow can be smoothly curved in one direction, and thus, flow resistance and flow noise can be reduced.

In some implementations, in the case of a structure in which ambient air is introduced through the front surface of the mask body 11, the inlet of the fan module 31 faces the inlet of the mask body 11.

In this structure, the flow trace of the ambient air passing through the fan module 31 may be indicated by the dotted arrow, and the center of curvature a2 of the flow trace of the ambient air introduced through the front surface of the mask body 11 can be located outside the mask body 11, that is, in front of the mask body 11.

For example, the center of curvature a2 of the flow trace of the ambient air passing through the fan module 31 and the center of curvature b of the flow trace of the ambient air flowing along the air guide surface 1334 are located in the opposite regions with respect to the mask body 11. That is, the introduced ambient air can flow in an S-shape.

In particular, since the flow change direction of the air passing through the fan module 31 and the flow change direction of the air flowing along the air guide surface 1334 are opposite to each other, air leaving the outlet of the fan module 31 collides with the portion where the air guide surface 1334 starts. As a result, a portion of the air flow at the entrance of the air duct 102 is converted to turbulence, increasing flow resistance and flow noise.

In summary, the mask apparatus 10 in which ambient air is introduced from the rear surface of the mask body 11 and discharged to the rear surface of the mask body 11 has advantages of significantly reducing flow resistance and flow noise, compared with the conventional mask apparatus in which ambient air is introduced from the front surface of the mask body 11.

Figure 25:
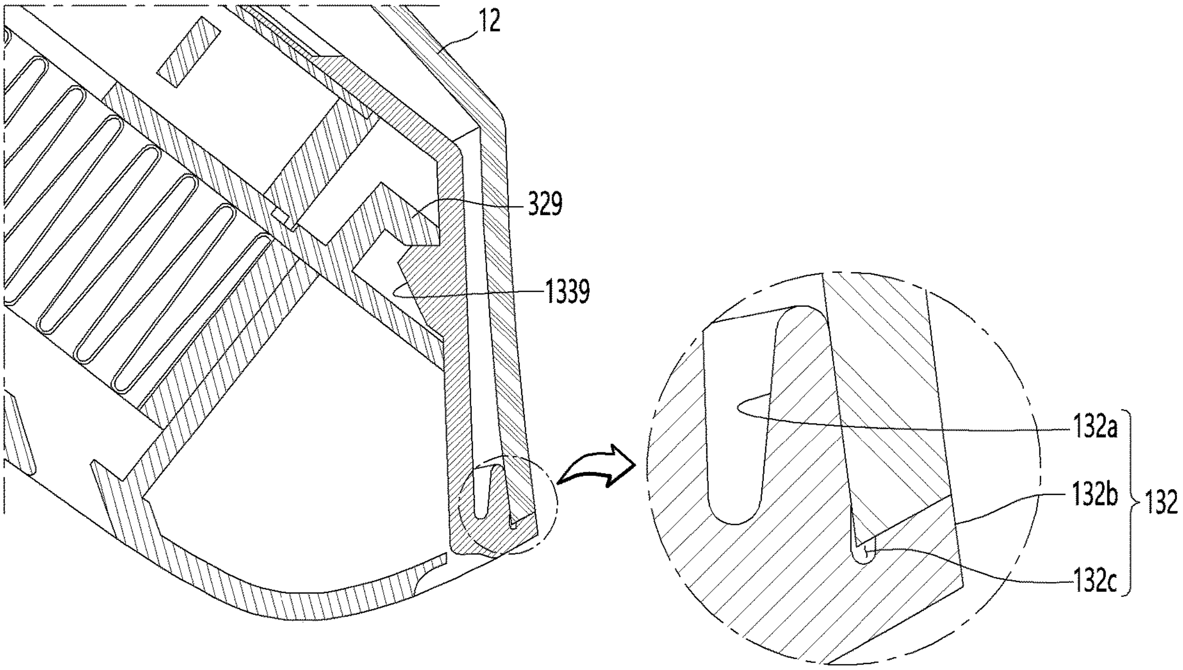
FIG. 25 is a diagram illustrating a partial cross-sectional view of a coupling structure of a front body and a rear body of a mask body of the exemplary mask apparatus.

FIG. 25 is a diagram illustrating a partial cross-sectional view of a coupling structure of a front body and a rear body of a mask body of the exemplary mask apparatus.

Referring to FIGS. 6 and 25, the mask apparatus 10 can include a mask body 11, and the mask body 11 can include a front body 12 and a rear body 13. The front body 12 and the rear body 13 can be made as a product of plastic injection molding.

For example, the fused portion 132 is provided to be bent on the front edge of the rear body 13. In some implementations, a length or width of the fused portion 132 provided along the lower surface edge of the rear body 13 is greater than a length or width of the fused portion 132 provided along the upper surface and both side edges of the rear body 13. Here, the length or width of the fused portion 132 may be understood to refer to a distance from the face cover portion 131 of the rear body 13 to an end portion of the fused portion 132.

In some implementations, a lower surface exhaust port 1362, a terminal insertion hole 1323, a button hole 1321, and an indication hole 1322 can be provided in the fused portion 132 provided along the lower surface edge of the rear body 13.

In some implementations, a seating portion 132*a* on which the rear edge of the front body 12 is seated and a support portion 132*b* supporting the end portion of the front body 12 can be provided at the end portion of the fused portion 132.

In some implementations, a moat portion 132*c* of a predetermined depth is recessed at an intersection where the seating portion 132*a* and the support portion 132*b* meet. The moat portion 132*c* can be a type of drainages for preventing a phenomenon that a portion of a melted injection product flows out of the coupling surface to cause burr when the front body 12 and the rear body 13 are in contact with each other and heat-sealed.

For example, in a state in which the rear surface of the front body 12 is seated on the seating portion 132*a* and the end portion of the front body 12 is in contact with the support portion 132*b*, when heat for fusion is applied, a portion of the edge of the front body 12 and a portion of the fused portion 132 of the rear body 13 are melted by heat and joined to each other.

Here, the melted injection product may flow down to the outside through the contact surface of the front body 12 and the rear body 13. Then, burr protrudes from the portion where the front body 12 and the rear body 13 are coupled, hardens and becomes dirty.

In order to prevent this phenomenon, the moat portion 132*c* can be provided to limit a portion of the injection product changed to a gel state from being discharged to the outside during the thermal fusion process.

As depicted, the moat portion 132*c* can be recessed to a predetermined depth in the same direction as an extending direction of the seating portion 132*a* from the edge where the seating portion 132*a* and the support portion 132*b* meet.

In addition or alternatively, the moat portion 132*c* can be recessed to a predetermined depth in the same direction as the extending direction of the support portion 132*b* from the edge where the seating portion 132*a* and the support portion 132*b* meet.

In addition or alternatively, the moat portion 132*c* can be recessed to a predetermined depth in any direction between an extending line of the seating portion 132*a* and an extending line of the support portion 132*b* from an edge where the seating portion 132*a* and the support portion 132*b* meet.

Figure 26:
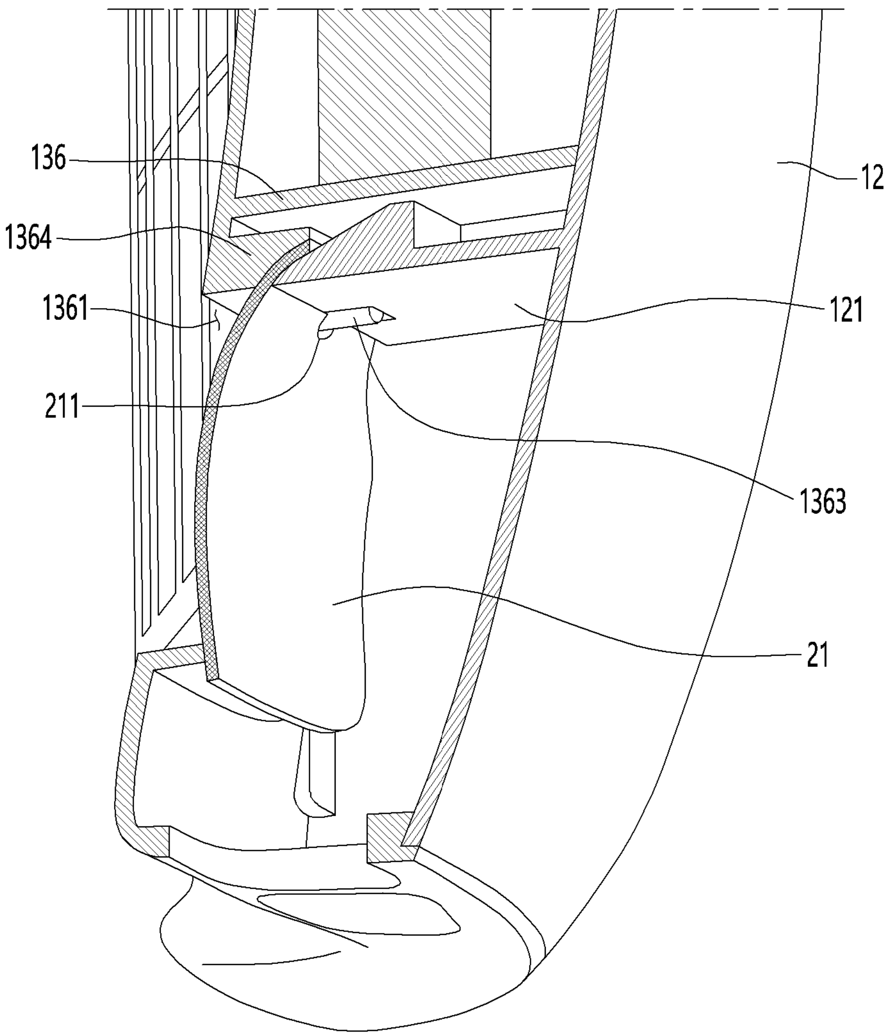
FIG. 26 is a diagram illustrating a partially cut-away perspective view depicting an exhaust valve coupling structure of an exemplary mask apparatus.
Figure 27:
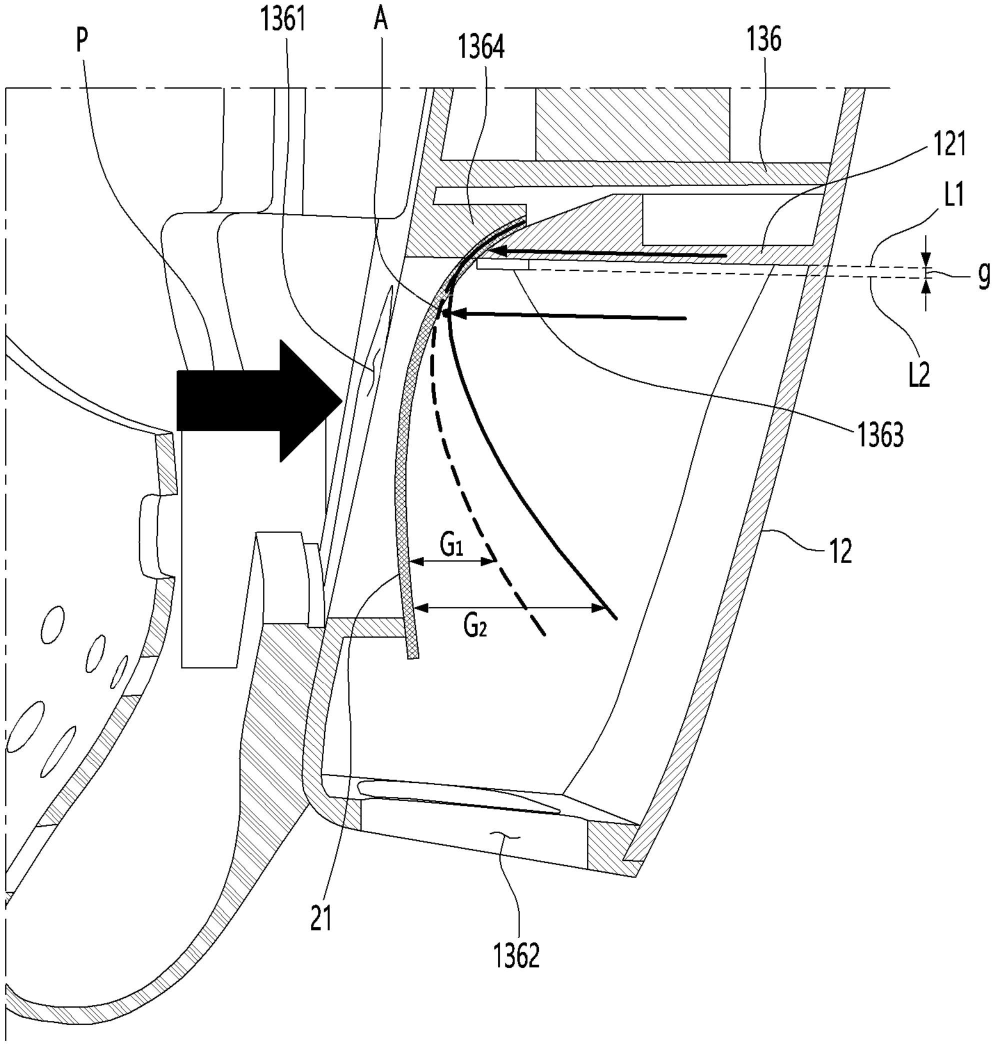
FIG. 27 is a diagram illustrating a partial longitudinal cross-sectional view of an exemplary mask apparatus depicting the exhaust valve coupling structure.

FIG. 26 is a diagram illustrating a partially cut-away perspective view depicting an exhaust valve coupling structure of an exemplary mask apparatus, and FIG. 27 is a diagram illustrating a partial longitudinal cross-sectional view of an exemplary mask apparatus depicting the exhaust valve coupling structure.

Referring to FIGS. 4, 26 and 27, the mask body 11 of the mask apparatus 10 can have an exhaust port for discharging the air exhaled by the user to the outside of the mask apparatus.

For example, the exhaust port includes a front surface exhaust port 1361 provided at the lower center of the rear body 13 and an exhaust port 1362 provided at the fused portion 132 bent and extending along the lower end of the face cover portion 131 of the rear body 13. Here, a portion of the fused portion 132 in which the lower exhaust port 1362 is provided can be defined as a lower fused portion.

In some implementations, the lower exhaust port 1362 is always maintained in an open state, while the front surface exhaust port 1361 is selectively opened and closed by the exhaust valve 21.

For example, the exhaust valve 21 can be disposed in front of the front surface exhaust port 1361, and can be seated on the front edge of the front surface exhaust port 1361. And, when the user breathes in, pressure of the respiration space defined inside the face guard 14 can be lower than atmospheric pressure and the exhaust valve 21 can block the front surface exhaust port 1361. Conversely, when the user breathes out, the exhaust valve 21 can be separated from the front edge of the front surface exhaust port 1361 as the pressure in the respiration space becomes higher than atmospheric pressure and the front surface exhaust port 1361 is opened.

A valve seating rib 1364 protruding from the front of the face cover portion 131 of the rear body 13 can be provided on the edge of the front surface exhaust port 1361, and the rear edge of the exhaust valve 21 can be seated on the valve seating rib 1364. The front surface exhaust port 1361 can be provided in the inner space of the valve seating rib 1364, and the front surface exhaust port 1361 can be divided into a plurality of small exhaust ports by a plurality of partition ribs extending in the vertical or horizontal direction so as to be provided in the form of an exhaust grille.

In some implementations, the exhaust valve 21 can have a bendable flap shape, and a through hole 211 can be defined at a point spaced apart downward from the upper end of the exhaust valve 21. The through hole 211 can be defined at each of a left edge and a right edge of the exhaust valve 21.

In some implementations, in the valve seating rib 1364, a portion where the upper end of the exhaust valve 21 is seated can be defined as an upper seating rib. The front surface of the upper seating rib can be concavely curved with a predetermined curvature or inclined at a predetermined angle, and since the upper end of the rear surface of the exhaust valve 21 is seated on the front surface of the upper seating rib, it can be defined as a valve support surface.

Since the upper end of the valve support surface is located forward than the lower end, when the exhaust valve 21 is seated on the valve support surface, the lower end of the exhaust valve 21 can be completely in close contact with the valve seating rib 1364. For example, the entire exhaust valve 21 can maintain a state in which the entirety of the exhaust valve 21 is completely in close contact with the valve seating rib 1364 from a time when the user inhales to a time immediately before the user exhales.

Here, the fact that the upper end of the valve support surface is located on the front side more than the lower end means that a horizontal distance from the front surface of the face cover portion 131 to the upper end of the valve support surface is longer than a horizontal distance from the front surface of the face cover portion 131 to the lower end of the valve support surface.

If the valve support surface forms a vertical surface, a phenomenon in which the lower end of the exhaust valve 21 is not properly seated on the valve seating rib 1364 and is separated may occur.

In some implementations, each of the front left edge and the right edge of the valve seating rib 1364 can have a valve support protrusion 1363. In some implementations, the valve support protrusion 1363 can pass through the through hole 211 of the exhaust valve 21 so that the exhaust valve 21 is mounted on the front surface exhaust port 1361.

Also, when the front body 12 is coupled to the front surface of the rear body 13 while the exhaust valve 21 is seated on the valve support surface of the upper seating rib, the valve support rib 121 (depicted in FIG. 5) protruding from the rear surface of the front body 12 can press the exhaust valve 21.

For example, the valve support rib 121 presses the front surface of the exhaust valve 21 so that the upper end of the rear surface of the exhaust valve 21 can be in close contact with the valve support surface. As a result, as the exhaust valve 21 is curved in a round shape, the lower end of the rear surface of the exhaust valve 21 can also be in close contact with the valve seating rib 1364.

Here, the shielding performance of the front surface exhaust port 1361 is proportional to the degree of close contact of the rear lower end of the exhaust valve 21 with the front surface of the valve seating rib 1364. The opening performance of the front surface exhaust port 1361 is proportional to the amount of bending of the exhaust valve 21.

In order to increase both the shielding performance and the opening performance of the front surface exhaust port 1361, the valve support protrusion 1363 may be designed to be provided at a lower point than the upper seating rib.

For example, a horizontal line L1 passing the front surface of the upper seating rib and the bottom surface of the valve support rib 121 can be located above a horizontal line L2 passing through the lower end of the valve support protrusion 1363, so as to be designed to be spaced apart from each other by a predetermined interval g. That is, since the valve support protrusion 1363 is positioned below the bottom surface of the valve support rib 121, a point at which the end of the valve support rib 121 contacts the front surface of the exhaust valve 21 is located to be higher than the lower end of the support protrusion 1363.

When the contact point of the end of the valve support rib 121 and the exhaust valve 21 is designed to be located below the lower end of the valve support protrusion 1363, the amount of bending G1 of the exhaust valve 21 caused by an exhalation pressure P is smaller than the amount of bending G2 of the exhaust valve 21 in the structure of the present disclosure.

For example, the amount of bending of the exhaust valve 21 increases as a fixing point for fixing the exhaust valve 21 is away from the center of the exhaust valve 21, so that the amount of opening of the front surface exhaust port 1361 increases.

Figure 28:
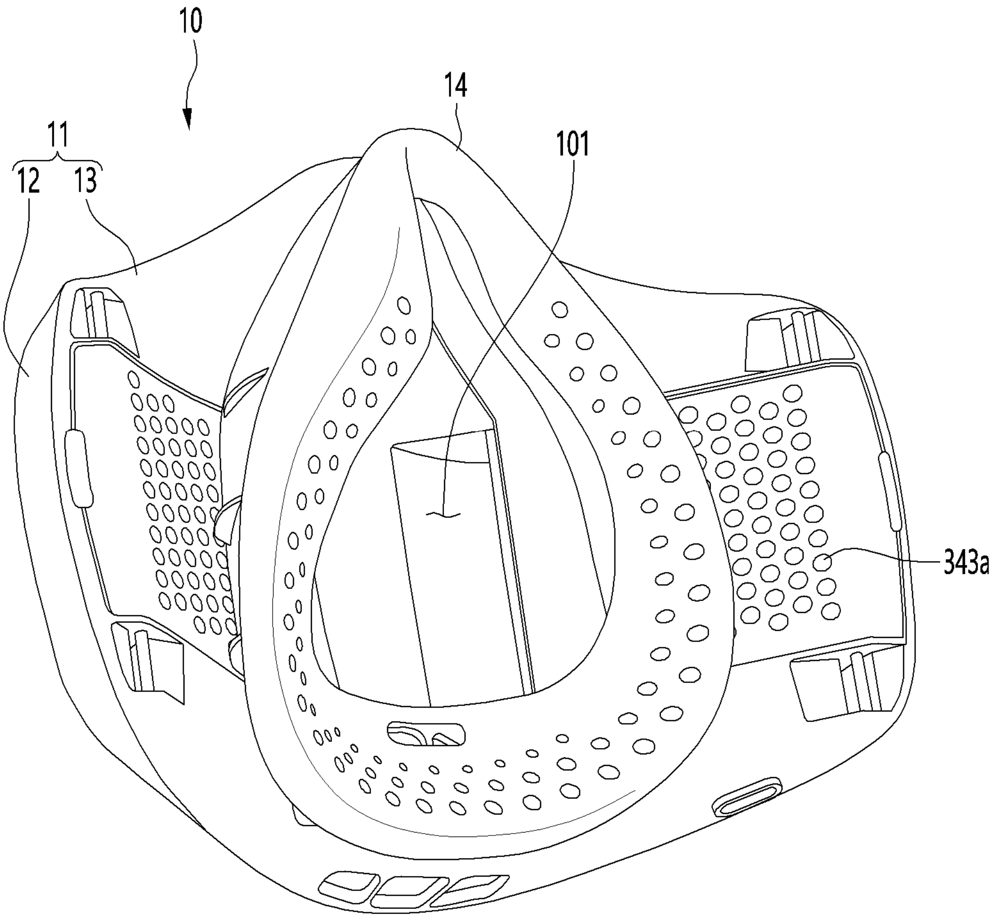
FIG. 28 is a diagram illustrating a rear perspective view of another exemplary mask apparatus including an intake.

FIG. 28 is a diagram illustrating a rear perspective view of another exemplary mask apparatus having an inlet.

Referring to FIG. 28, the inlet 343*a* of the mask apparatus 10 includes a plurality of holes in the filter cover 342.

For example, the inlet 343*a* can be defined in a region of the filter cover 342 defined by the grille forming portion 342*a* and can be provided as a so-called a hole array form in which a plurality of holes are defined in a width direction (horizontal direction) and a length direction (vertical direction) of the mask body 11.

The plurality of holes constituting the hole array can have the same diameter or can have different diameters depending on a formation point.

For example, the hole array can be designed in such a manner that the diameter decreases toward the center of the mask body 11 from the side end portion of the mask body 11.

In addition or alternatively, in a region where a distance between the face guard 14 and the rear surface of the mask body 11 is so short that ambient air is not easily introduced, the diameter of the hole can be small, and the diameter of the hole can increase toward the side end portion of the mask body 11.

In addition or alternatively, the diameter of the hole can decrease from the center toward the edge of the hole array.

In addition or alternatively, the diameter of the hole can increase or decrease from the top to the bottom of the hole array.

What is claimed is:

1. A mask apparatus comprising:

a mask body having an inlet and outlet, the mask body including:

a rear body, and a front body coupled to a front surface of the rear body;

a face guard that is coupled to a rear surface of the rear body, that is configured to accommodate a portion of user's face, and that defines a respiration space at an inner side thereof; and an air cleaning module that is mounted on the rear body, that is configured to purify air introduced into the inlet, and that is configured to supply the purified air to the respiration space, wherein a portion of the rear body protrudes toward the front body to define an accommodation portion configured to accommodate the air cleaning module, wherein the accommodation portion is provided in a pair, wherein each of the accommodation portions includes:

a fastening surface extending forward from a side end portion of the rear body, a seating surface that extends toward a center of the rear body from an end portion of the fastening surface and that accommodates the air cleaning module, and an air guide surface connecting an end portion of the seating surface to the front surface of the rear body, wherein the air cleaning module includes:

a fan module disposed at a seating portion of each of the accommodation portions, a filter that is disposed at a rear side of the fan module and that is configured to purify air flowing into the fan module, and a filter housing including a filter frame that surrounds a side surface of the filter and a filter cover that covers a rear surface of the filter, wherein the inlet is provided at the filter cover in the rear surface of the rear body and disposed at an outside of the face guard, to thereby introduce ambient air into the mask body through the inlet, and wherein the outlet is provided at the rear surface of the rear body and disposed at an inside of the face guard, to thereby supply the purified air into the respiration space through the outlet.

2. The mask apparatus of claim 1, wherein the inlet has a shape of an intaking grille that includes a plurality of intaking slits and a plurality of partitioning ribs.

3. The mask apparatus of claim 2, wherein the plurality of intaking slits and the plurality of partitioning ribs (i) extend from an upper end of the filter cover toward a lower end of the filter cover and (ii) are alternately arranged from a first side end portion of the filter cover to a second side end portion of the filter cover, and wherein a distance between the first side end portion and a center of the mask body is shorter than a distance between the first side end portion and an edge of the mask body.

4. The mask apparatus of claim 3, wherein each of the plurality of partitioning ribs includes:

an entrance surface defining a portion of the rear surface of the mask body, an exit surface corresponding to an opposite surface of the entrance surface, a first side surface facing the first side end portion of the filter cover, and a second side surface corresponding to an opposite side of the first side surface, and wherein the first side surface and the second side surface are inclined at a predetermined angle with respect to a reference line perpendicular to the entrance surface or the exit surface.

5. The mask apparatus of claim 4, wherein a first inclination angle between the first side surface and the reference line is greater than a second inclination angle between the second side surface and the reference line.

6. The mask apparatus of claim 5, wherein the first inclination angle includes a first set of inclination angles and the second inclination angle includes a second set of inclination angles, wherein the first set of inclination angles correspond to the plurality of partitioning ribs and increase toward the first side end portion of the filter cover, and wherein the second set of inclination angles correspond to the plurality of partitioning ribs and increase toward the first side end portion of the filter cover.

7. The mask apparatus of claim 6, wherein a value of the first inclination angle of a first rib of the plurality of partitioning ribs is equal to a value of the second inclination angle of a second rib of the plurality of partitioning ribs facing the first inclination angle, the second rib being adjacent to the first rib among the plurality of partitioning ribs.

8. The mask apparatus of claim 3, further comprising:

a reinforcing rib partitioning the inlet into an upper intake grille and a lower intake grille.

9. The mask apparatus of claim 1, wherein each of the accommodation portions further includes:

an upper surface connecting upper ends of the fastening surface, the seating surface, and the air guide surface to the front surface of the rear body, and a lower surface connecting lower ends of the fastening surface, the seating surface, and the air guide surface to the front surface of the rear body.

10. The mask apparatus of claim 9, wherein at least one of the fastening surface or the air guide surface is curved.

11. The mask apparatus of claim 1, wherein the inlet is a hole array in which a plurality of holes are defined.

12. The mask apparatus of claim 11, wherein the plurality of holes are defined in a width direction and a length direction of the mask body.

13. The mask apparatus of claim 12, wherein the plurality of holes have a same diameter.

14. The mask apparatus of claim 12, wherein the plurality of holes have different diameters.

15. The mask apparatus of claim 14, wherein diameters of the plurality of holes decrease from a side end portion of the mask body toward a center of the mask body.

16. The mask apparatus of claim 14, wherein diameters of the plurality of holes decrease from a center of the mask body toward an edge of the hole array.

17. The mask apparatus of claim 14, wherein diameters of the plurality of holes increase from a top of the hole array to a bottom of the hole array.

18. The mask apparatus of claim 14, wherein diameters of the plurality of holes decrease from a top of the hole array to a bottom of the hole array.

* * * * *